US012187021B2

(12) United States Patent
Ho et al.

(10) Patent No.: US 12,187,021 B2
(45) Date of Patent: Jan. 7, 2025

(54) METHOD FOR COMPOSITE DELAMINATION

(71) Applicant: GRST International Limited, Hong Kong (CN)

(72) Inventors: Kam Piu Ho, Hong Kong (CN); Yingkai Jiang, Shenzhen (CN); Yangjian Dong, Mianyang (CN)

(73) Assignee: GRST International Limited, Hong Kong (CN)

( * ) Notice: Subject to any disclaimer, the term of this patent is extended or adjusted under 35 U.S.C. 154(b) by 60 days.

(21) Appl. No.: 17/917,949

(22) PCT Filed: Mar. 15, 2021

(86) PCT No.: PCT/CN2021/080682
§ 371 (c)(1),
(2) Date: Oct. 10, 2022

(87) PCT Pub. No.: WO2021/253885
PCT Pub. Date: Dec. 23, 2021

(65) Prior Publication Data
US 2023/0136670 A1    May 4, 2023

(30) Foreign Application Priority Data

Jun. 17, 2020  (WO) ................ PCT/CN2020/096672
Aug. 19, 2020  (WO) ................ PCT/CN2020/110065
Sep. 25, 2020  (WO) ................ PCT/CN2020/117789

(51) Int. Cl.
*B32B 43/00*     (2006.01)
*C11D 7/06*      (2006.01)
(Continued)

(52) U.S. Cl.
CPC .............. *B32B 43/006* (2013.01); *C11D 7/06* (2013.01); *C11D 7/5004* (2013.01); *C22B 7/008* (2013.01);
(Continued)

(58) Field of Classification Search
CPC ............. B32B 43/006; Y10T 156/1111; Y10T 156/1116
See application file for complete search history.

(56) References Cited

U.S. PATENT DOCUMENTS 2,679,986 A      6/1954  Fridolph
2021/0178744 A1* 6/2021  Ohara ...................... C08J 11/16

FOREIGN PATENT DOCUMENTS

CN    102770995 A    11/2012
CN    106505273 A    3/2017
(Continued)

OTHER PUBLICATIONS

CN107739830 spec translation (Year: 2017).*
(Continued)

*Primary Examiner* — Philip C Tucker
*Assistant Examiner* — Nickolas R Harm

(57) ABSTRACT

The invention provides a method for delaminating a composite by immersing the composite into a delamination solution; wherein the composite comprises a metal substrate and a coating applied on one side or both sides of the metal substrate, wherein the coating comprises a polymeric binder; and wherein the polymeric binder comprises an aqueous copolymer. The use of delamination solution comprising a weak base allows for complete delamination of the composite in a highly efficient and extremely fast manner. Furthermore, the delamination method disclosed herein circumvents complex separation processes, contamination and corrosion of the metal substrate and enables an excellent (Continued)

materials recovery. An application of the method for delaminating an electrode for a battery is disclosed herein.

18 Claims, 3 Drawing Sheets

(51) Int. Cl.
*C11D 7/50* (2006.01)
*C22B 7/00* (2006.01)
*C22B 21/00* (2006.01)
*H01M 4/04* (2006.01)
*H01M 4/36* (2006.01)
*H01M 4/62* (2006.01)
*H01M 10/0525* (2010.01)
*H01M 10/54* (2006.01)
*H01M 4/02* (2006.01)

(52) U.S. Cl.
CPC ....... *C22B 21/0023* (2013.01); *H01M 4/0404* (2013.01); *H01M 4/366* (2013.01); *H01M 4/621* (2013.01); *H01M 4/622* (2013.01); *H01M 4/624* (2013.01); *H01M 4/625* (2013.01); *H01M 10/0525* (2013.01); *H01M 10/54* (2013.01); *B32B 2250/02* (2013.01); *B32B 2305/70* (2013.01); *B32B 2457/10* (2013.01); *C11D 2111/16* (2024.01); *H01M 2004/028* (2013.01); *Y10T 156/1111* (2015.01); *Y10T 156/1116* (2015.01)

(56) References Cited

FOREIGN PATENT DOCUMENTS

| CN | 106750903 A | 5/2017 | |
|---|---|---|---|
| CN | 107739830 A | 2/2018 | |
| CN | 108780894 A | 11/2018 | |
| CN | 109690841 A | 4/2019 | |
| CN | 110783570 A | 2/2020 | |
| JP | S5840143 A | 3/1983 | |
| KR | 20130099568 A | 9/2013 | |
| WO | 2009098986 A1 | 8/2009 | |
| WO | 2015034433 A1 | 3/2015 | |
| WO | WO-2020066652 A1 * | 4/2020 | ........... B32B 43/006 |

OTHER PUBLICATIONS

CN108780894 spec translation (Year: 2017).*
International Search Report of PCT Patent Application No. PCT/CN2021/080682 issued on Jun. 18, 2021.
European Search Report of European Patent Application No. 21827044.5 issued on Jun. 20, 2024.

* cited by examiner

100

200

METHOD FOR COMPOSITE DELAMINATION

CROSS-REFERENCE TO RELATED APPLICATIONS

This is a U.S. national stage application of the International Patent Application No. PCT/CN2021/080682, filed Mar. 15, 2021, which claims the benefit under 35 U.S.C. § 365(c) of International Patent Application No. PCT/CN2020/096672, filed Jun. 17, 2020, International Patent Application No. PCT/CN2020/110065, filed Aug. 19, 2020 and International Patent Application No. PCT/CN2020/117789, filed Sep. 25, 2020, the content of all of which are incorporated herein by reference in their entireties.

FIELD OF THE INVENTION

The present invention relates to the field of methods of materials recycling. In particular, this invention relates to a method of delamination of a composite comprising a metal substrate and a coating applied on one side or both sides of the metal substrate.

BACKGROUND OF THE INVENTION

The increasing urbanization, rapid development of technological innovations and consequent frequent replacement of products or disposal of waste consumables have resulted in shorter lifespans for products and/or over-production of waste. With the emergence of the growing problems associated with waste over-generation such as detrimental effects on human health, adverse environmental impacts and resource depletion, there has been an urge in taking prompt actions to resolve these complications worldwide using various means of waste material processing.

Recycling, being a key component in waste reduction hierarchy, aims to recover invaluable materials from waste for reuse. Recycling of materials brings about conservation of natural resources, reduction in energy consumption (and hence, production costs) associated with extraction of raw materials and alleviates environmental impacts by reducing greenhouse gases and $SO_x$ emissions. Owing to the substantial benefits that materials recycling has to offer, developing highly efficient methods to recycle materials is of utmost importance in achieving a circular economy.

The term "composite" refers to a metal substrate with a coating applied on one side or both sides of the metal substrate, wherein the coating comprises a polymeric binder. The polymeric binder is responsible for the adhesion between the coating and the metal substrate. Application of a coating on a metal substrate is a method for altering surface properties to meet performance requirements in a variety of technical applications. Some applications of coatings include adhesives, barrier formation, scratch and abrasion resistance, chemical resistance, wettability, and biocompatibility. Coating on a metal substrate has been frequently adopted in battery manufacturing, membrane technology, packaging materials, printed circuit boards, wirings or cables, and biomedical applications. Separation of the coating from the metal substrate is then a technique that is heavily involved in materials recycling.

However, for products having reached their end-of-life, or with product rejects during the manufacturing process which are ready for immediate recycling, undergoing the step of separation of the composites contained within the products into coating and metal substrate during recycling present several difficulties.

In one respect, the delamination of the composite might occur within the bulk of the coating, rather than at the coating-metal substrate interface. The coating may then not be fully delaminated from the metal substrate, with parts of coating remaining intact on the metal substrate. This would give rise to an undesirable loss of coating materials unable to be recovered directly through the delamination process, and a reclaimed metal substrate with high levels of impurities due to presence of remaining coating that requires introduction of subsequent separation processes.

In another respect, delamination of the coating from the metal substrate might be highly inefficient, taking up to several hours. Exposing the composite to drastic delamination conditions for a sustained period of time is likely to cause side effects such as corrosion, dissolution and damage of materials within the composite, particularly the metal substrate, and generation of side reaction products.

Commonly used polymeric binders responsible for coating-metal substrate adhesion, such as polyvinylidene fluoride (PVDF), have their downsides, being their insolubility in water, and indeed these polymers can only dissolve in some specific organic solvents such as N-methyl-2-pyrrolidone (NMP). NMP is flammable and toxic, and hence requires specific handling. An NMP recovery system must be in place during the drying process to recover NMP vapors. This will generate significant costs in the manufacturing process since a large capital investment would be required to set up such a recovery system. Therefore, for applications where exposure to moisture in the manufacturing process is not a significant concern, the use of polymeric binders that utilizes less expensive and more environmentally-friendly solvents, such as aqueous solvents, most commonly water, are preferred in the present invention since it can reduce the large capital cost of the recovery system.

Polymeric binders that are suitable for use in water-based coatings exhibit superior dispersion and stability in water, and are capable of promoting an exceptionally strong coating-metal substrate adhesion. However, it is precisely the exceptionally strong coating-metal substrate adhesion when these polymeric binders are used with which an exceptional challenge in the delamination of water-based coating from their associated metal substrates is posed. To better optimize the properties of these water-based binders, copolymers comprising structural units derived from various different monomers have been adopted, but these copolymeric binders when used in coatings would still present considerable challenges in delamination.

Delamination of composite is achieved via bond disruption and/or breakage between the polymeric binder within the coating, and the metal substrate at the coating-metal substrate interface. Accordingly, it is a crucial aim to more efficiently break and/or disrupt such bonds between the polymeric binder within the coating, and the metal substrate, in order for delamination to occur with high speed, high recovery rate, high safety but low quantity of additional materials used and low costs required.

Attempts have been made in developing methods in attaining complete delamination of composites. KR Patent Application Publication No. 20130099568 A discloses a method for separating a composite comprising a polymer film coated on a metal surface by carbonizing the polymer using electromagnetic induction. The metal-polymer composite is first subjected to a step of pre-treatment wherein the polymer-metal composite is charged in an induction furnace so as to receive the maximum influence of magnetic density per unit area during induction heating, making the movement of electrons on the metal surface more active. Through induction heating, the metal-polymer composite is then heated up to 500-900° C., which weakens the binding force between the polymer and the metal surface and subsequently induces the thermal decomposition and carbonization of the polymer coated on the metal surface, allowing for easy separation. This method offers significant energy savings by employing induction heating. However, this proposed method brings about the carbonization of the polymer where reclamation of the polymer is not possible. Furthermore, hazardous or toxic pollutants might be produced in the process of polymer decomposition.

In view of the above-mentioned challenges, there is always a need to develop a unified and simple method to achieve highly efficient and complete delamination of composite at the coating-metal substrate interface, wherein the coating of the composite comprises a polymeric binder, and wherein the polymeric binder is a copolymer. The method for delamination of composite disclosed herein is developed to achieve efficient bond disruption and/or breakage between the copolymeric binder in the coating of the composite and the metal substrate. Accordingly, a delamination method that fulfills these qualities is applicable to composites comprising a copolymeric binder. Such a method would circumvent both complex separation processes and contamination of metal substrate, enable excellent material recovery rates, and allow the delamination of composite to be accomplished within a short time frame.

SUMMARY OF THE INVENTION

The aforementioned needs are met by various aspects and embodiments disclosed herein. In one aspect, provided herein is a method for delaminating a composite by immersing the composite into a delamination solution; wherein the composite comprises a metal substrate and a coating applied on one side or both sides of the metal substrate, wherein the coating comprises a copolymeric binder.

In some embodiments, the metal substrate is selected from the group consisting of stainless steel, titanium, nickel, aluminum, copper, platinum, gold, silver, chromium, zirconium, tungsten, molybdenum, tin, vanadium, zinc, cadmium, iron, cobalt, lead, and alloys thereof.

In some embodiments, the delamination solution comprises a delamination agent and an aqueous solvent.

In some embodiments, the delamination agent is a weak base. In some embodiments, the delamination agent is selected from the group consisting of sodium carbonate, potassium carbonate, lithium carbonate, rubidium carbonate, cesium carbonate, ammonia, methylamine, dimethylamine, trimethylamine, ethylamine, diethylamine, triethylamine, propylamine, isopropylamine, dipropylamine, diisopropyl amine, isopropyl ethylamine, diisopropylethylamine, n-butylamine, isobutylamine, di n-butylamine, diisobutylamine, tributylamine, tert-butyl amine, pyridine, piperidine, 4-dimethylaminopyridine (DMAP), 1,8-diazabicyclo[5.4.0]undec-7-ene (DBU), 1,5-diazabicyclo[4.3.0]non-5-ene (DBN), N-methylmorpholine (NMM), 1,4-diazabicyclo[2.2.2]octane (DABCO), 2,6-lutidine, and combinations thereof.

Delamination of a composite attained using the method provided herein is very rapid and simple, and does not incur a penalty in terms of loss in irrecoverable coating materials, damage in the coating materials, or the introduction of impurities in metal substrates.

In another aspect, as one of the applications of the present invention, the aforementioned method is employed in delaminating a battery electrode, wherein the composite is a battery electrode, the metal substrate is a current collector and the coating is an electrode layer. Provided herein is a method for delaminating a battery electrode by immersing the electrode into a delamination solution; wherein the electrode comprises a current collector and an electrode layer coated on one side or both sides of the current collector, wherein the electrode layer comprises a copolymeric binder.

The simple utilization of a delamination solution in the present invention to delaminate a battery electrode at the electrode layer-current collector interface can drastically shorten the time taken to achieve complete delamination, maximize the recovery of invaluable materials, eliminate contamination of the current collector, and does not require the need for subsequent downstream processing. Furthermore, the method disclosed herein is found to be applicable to the delamination of both cathodes and anodes without presenting corrosion concerns to the current collector and/or electrode active materials within the electrode layer.

DETAILED DESCRIPTION OF THE INVENTION

Figure 1:
FIG. 1 shows a simplified view of an embodiment of a composite.

In one aspect, provided herein is a method for delaminating a composite by immersing the composite into a delamination solution; wherein the composite comprises a metal substrate and a coating applied on one side or both sides of the metal substrate, wherein the coating comprises a copolymeric binder.

In another aspect, provided herein is a method for delaminating a lithium-ion battery electrode by immersing the electrode into a delamination solution; wherein the electrode comprises a current collector and an electrode layer coated on one side or both sides of the current collector, wherein the electrode layer comprises a copolymeric binder.

The term "electrode" refers to a "cathode" or an "anode."

The term "positive electrode" is used interchangeably with cathode. Likewise, the term "negative electrode" is used interchangeably with anode.

The term "binder" or "binder material" refers to a chemical compound, mixture of compounds, or polymer that is used to hold material(s) in place and adhere them onto a conductive metal substrate to form a composite. In some embodiments, the binder refers to a chemical compound, mixture of compounds, or polymer that is used to hold an electrode material and/or a conductive agent in place and adhere them onto a conductive metal part to form an electrode. In some embodiments, the electrode does not comprise any conductive agent.

The term "conductive agent" refers to a material that has good electrical conductivity. Therefore, the conductive agent is often mixed with an electrode active material at the time of forming an electrode to improve electrical conductivity of the electrode. In some embodiments, the conductive agent is chemically active. In some embodiments, the conductive agent is chemically inactive.

The term "composite" refers to a metal substrate with a coating applied on one side or both sides of the metal substrate, wherein the metal substrate and the coating can each comprise one or more layers. The term "constituents" in the context of a composite refers to the metal substrate and the coating.

The term "polymer" refers to a compound prepared by polymerizing monomers, whether of the same or a different type. The generic term "polymer" embraces the terms "homopolymer" as well as "copolymer".

The term "aqueous polymer" refers to a polymer that can be dispersed in an aqueous solvent such as water to form a solution or a colloidal system, wherein the polymer in the colloidal system does not readily self-aggregate.

The term "homopolymer" refers to a polymer prepared by the polymerization of the same type of monomer.

The term "copolymer" refers to a polymer prepared by the polymerization of two or more different types of monomers.

The term "polymeric binder" refers to a binder that is of a polymeric nature. The term "copolymeric binder" then refers to a polymeric binder wherein the binder is specifically a copolymer.

The term "unsaturated" as used herein, refers to a moiety having one or more units of unsaturation.

The term "alkyl" or "alkyl group" refers to a univalent group having the general formula $C_nH_{2n+1}$ derived from removing a hydrogen atom from a saturated, unbranched or branched aliphatic hydrocarbon, where n is an integer, or an integer between 1 and 20, or between 1 and 8. Examples of alkyl groups include, but are not limited to, ($C_1$-$C_8$)alkyl groups, such as methyl, ethyl, propyl, isopropyl, 2-methyl-1-propyl, 2-methyl-2-propyl, 2-methyl-1-butyl, 3-methyl-1-butyl, 2-methyl-3-butyl, 2,2-dimethyl-1-propyl, 2-methyl-1-pentyl, 3-methyl-1-pentyl, 4-methyl-1-pentyl, 2-methyl-2-pentyl, 3-methyl-2-pentyl, 4-methyl-2-pentyl, 2,2-dimethyl-1-butyl, 3,3-dimethyl-1-butyl, 2-ethyl-1-butyl, butyl, isobutyl, t—butyl, pentyl, isopentyl, neopentyl, hexyl, heptyl, and octyl. Longer alkyl groups include nonyl and decyl groups. An alkyl group can be unsubstituted or substituted with one or more suitable substituents. Furthermore, the alkyl group can be branched or unbranched. In some embodiments, the alkyl group contains at least 2, 3, 4, 5, 6, 7, or 8 carbon atoms.

The term "cycloalkyl" or "cycloalkyl group" refers to a saturated or unsaturated cyclic non-aromatic hydrocarbon radical having a single ring or multiple condensed rings. Examples of cycloalkyl groups include, but are not limited to, ($C_3$-$C_7$)cycloalkyl groups, such as cyclopropyl, cyclobutyl, cyclopentyl, cyclohexyl, and cycloheptyl, and saturated cyclic and bicyclic terpenes and ($C_3$-$C_7$)cycloalkenyl groups, such as cyclopropenyl, cyclobutenyl, cyclopentenyl, cyclohexenyl, and cycloheptenyl, and unsaturated cyclic and bicyclic terpenes. A cycloalkyl group can be unsubstituted or substituted by one or two suitable substituents. Furthermore, the cycloalkyl group can be monocyclic or polycyclic. In some embodiments, the cycloalkyl group contains at least 5, 6, 7, 8, 9, or 10 carbon atoms.

The term "alkoxy" refers to an alkyl group, as previously defined, attached to the principal carbon chain through an oxygen atom. Some non-limiting examples of the alkoxy group include methoxy, ethoxy, propoxy, butoxy, and the like. And the alkoxy defined above may be substituted or unsubstituted, wherein the substituent may be, but is not limited to, deuterium, hydroxy, amino, halo, cyano, alkoxy, alkyl, alkenyl, alkynyl, mercapto, nitro, and the like.

The term "alkenyl" refers to an unsaturated straight chain, branched chain, or cyclic hydrocarbon radical that contains one or more carbon-carbon double bonds. Examples of alkenyl groups include, but are not limited to, ethenyl, 1-propenyl, and 2-propenyl; and which may optionally be substituted on one or more of the carbon atoms of the radical.

The term "aryl" or "aryl group" refers to an organic radical derived from a monocyclic or polycyclic aromatic hydrocarbon by removing a hydrogen atom. Non-limiting examples of the aryl group include phenyl, naphthyl, benzyl, tolanyl, sexiphenyl, phenanthrenyl, anthracenyl, coronenyl, and tolanylphenyl. An aryl group can be unsubstituted or substituted with one or more suitable substituents. Furthermore, the aryl group can be monocyclic or polycyclic. In some embodiments, the aryl group contains at least 6, 7, 8, 9, or 10 carbon atoms.

The term "aliphatic" refers to a $C_1$ to $C_{30}$ alkyl group, a $C_2$ to $C_{30}$ alkenyl group, a $C_2$ to $C_{30}$ alkynyl group, a $C_1$ to $C_{30}$ alkylene group, a $C_2$ to $C_{30}$ alkenylene group, or a $C_2$ to $C_{30}$ alkynylene group. In some embodiments, the alkyl group contains at least 2, 3, 4, 5, 6, 7, or 8 carbon atoms.

The term "aromatic" refers to groups comprising aromatic hydrocarbon rings, optionally including heteroatoms or substituents. Examples of such groups include, but are not limited to, phenyl, tolyl, biphenyl, o-terphenyl, m-terphenyl, p-terphenyl, naphthyl, anthryl, phenanthryl, pyrenyl, triphenylenyl, and derivatives thereof.

The term "substituted" as used to describe a compound or chemical moiety refers to that at least one hydrogen atom of that compound or chemical moiety is replaced with a second chemical moiety. Examples of substituents include, but are not limited to, halogen; alkyl; heteroalkyl; alkenyl; alkynyl; aryl, heteroaryl, hydroxyl; alkoxyl; amino; nitro; thiol; thioether; imine; cyano; amido; phosphonato; phosphine; carboxyl; thiocarbonyl; sulfonyl; sulfonamide; acyl; formyl; acyloxy; alkoxycarbonyl; oxo; haloalkyl (e.g., trifluoromethyl); carbocyclic cycloalkyl, which can be monocyclic or fused or non-fused polycyclic (e.g., cyclopropyl, cyclobutyl, cyclopentyl or cyclohexyl) or a heterocycloalkyl, which can be monocyclic or fused or non-fused polycyclic (e.g., pyrrolidinyl, piperidinyl, piperazinyl, morpholinyl or thiazinyl); carbocyclic or heterocyclic, monocyclic or fused or non-fused polycyclic aryl (e.g., phenyl, naphthyl, pyrrolyl, indolyl, furanyl, thiophenyl, imidazolyl, oxazolyl, isoxazolyl, thiazolyl, triazolyl, tetrazolyl, pyrazolyl, pyridinyl, quinolinyl, isoquinolinyl, acridinyl, pyrazinyl, pyridazinyl, pyrimidinyl, benzimidazolyl, benzothiophenyl or benzofuranyl); amino (primary, secondary or tertiary); o-lower alkyl; o-aryl, aryl; aryl-lower alkyl; $-CO_2CH_3$; $-CONH_2$; $-OCH_2CONH_2$; $-NH_2$; $-SO_2NH_2$; $-OCHF_2$; $-CF_3$; $-OCF_3$; $-NH(alkyl)$; $-N(alkyl)_2$; $-NH(aryl)$; $-N(alkyl)(aryl)$; $-N(aryl)_2$; $-CHO$; $-CO(alkyl)$; $-CO(aryl)$; $-CO_2(alkyl)$; and $-CO_2(aryl)$; and such moieties can also be optionally substituted by a fused-ring structure or bridge, for example —OCH$_2$O—. These substituents can optionally be further substituted with a substituent selected from such groups. All chemical groups disclosed herein can be substituted, unless it is specified otherwise.

The term "halogen" or "halo" refers to F, Cl, Br or I.

The term "monomeric unit" refers to the constitutional unit contributed by a single monomer to the structure of a polymer.

The term "structural unit" refers to the total monomeric units contributed by the same monomer type in a polymer.

The term "acid salt group" refers to the acid salt formed when an acid reacts with a base. In some embodiments, the proton of the acid is replaced with a metal cation. In some embodiments, the proton of the acid is replaced with an ammonium ion.

The term "planetary mixer" refers to an equipment that can be used to mix or stir different materials for producing a homogeneous mixture, which consists of blades conducting a planetary motion within a vessel. In some embodiments, the planetary mixer comprises at least one planetary blade and at least one high-speed dispersion blade. The planetary and the high-speed dispersion blades rotate on their own axes and also rotate continuously around the vessel. The rotation speed can be expressed in unit of rotations per minute (rpm) which refers to the number of rotations that a rotating body completes in one minute.

The term "ultrasonicator" refers to an equipment that can apply ultrasound energy to agitate particles in a sample. Any ultrasonicator that can disperse the slurry disclosed herein can be used herein. Some non-limiting examples of the ultrasonicator include an ultrasonic bath, a probe-type ultrasonicator, and an ultrasonic flow cell.

The term "ultrasonic bath" refers to an apparatus through which the ultrasonic energy is transmitted via the container's wall of the ultrasonic bath into the liquid sample.

The term "probe-type ultrasonicator" refers to an ultrasonic probe immersed into a medium for direct sonication. The term "direct sonication" means that the ultrasound is directly coupled into the processing liquid.

The term "ultrasonic flow cell" or "ultrasonic reactor chamber" refers to an apparatus through which sonication processes can be carried out in a flow-through mode. In some embodiments, the ultrasonic flow cell is in a single-pass, multiple-pass or recirculating configuration.

The term "applying" refers to an act of laying or spreading a substance on a surface.

The term "current collector" refers to any conductive layer which is in contact with an electrode layer, and is capable of conducting an electrical current flowing to electrodes during discharging or charging a secondary battery. Some non-limiting examples of the current collector include a single conductive metal layer or substrate, and a single conductive metal layer or substrate with an overlying conductive coating layer, such as a carbon black-based coating layer. The conductive metal layer or substrate may be in the form of a foil or a porous body having a three-dimensional network structure. In some embodiments, the three-dimensional porous current collector is coated with a conformal carbon layer.

The term "electrode layer" refers to a coating, which is in contact with a current collector, that comprises an electrochemically active material. In some embodiments, the electrode layer is made by applying a coating on to the current collector. In some embodiments, the electrode layer is located on one side or both sides of the current collector. In other embodiments, the three-dimensional porous current collector is coated conformally with an electrode layer. Accordingly, an electrode is a composite, where the current collector is the metal substrate, while the electrode layer is the coating.

The term "room temperature" refers to indoor temperatures from about 18° C. to about 30° C., e.g., 18, 19, 20, 21, 22, 23, 24, 25, 26, 27, 28, 29, or 30° C. In some embodiments, room temperature refers to a temperature of about 20° C. +/−1° C. or +/−2° C. or +/−3° C. In other embodiments, room temperature refers to a temperature of about 22° C. or about 25° C.

The term "solid content" refers to the amount of non-volatile material remaining after evaporation.

The term "peeling strength" refers to the amount of force required to separate a current collector and an electrode active material coating that are bonded to each other. It is a measure of the binding strength between such two materials and is usually expressed in N/cm.

The term "adhesive strength" refers to the amount of force required to separate a current collector and a polymeric binder coating that are bonded to each other. It is a measure of the adhesion strength between such two materials and is usually expressed in N/cm.

The term "C rate" refers to the charging or discharging rate of a cell or battery, expressed in terms of its total storage capacity in Ah or mAh. For example, a rate of 1 C means utilization of all of the stored energy in one hour; a 0.1 C means utilization of 10% of the energy in one hour or full energy in 10 hours; and a 5 C means utilization of full energy in 12 minutes.

The term "ampere-hour (Ah)" refers to a unit used in specifying the storage capacity of a battery. For example, a battery with 1 Ah capacity can supply a current of one ampere for one hour or 0.5 A for two hours, etc. Therefore, 1 ampere-hour (Ah) is the equivalent of 3,600 coulombs of electrical charge. Similarly, the term "milliampere-hour (mAh)" also refers to a unit of the storage capacity of a battery and is 1/1,000 of an ampere-hour.

The term "battery cycle life" refers to the number of complete charge/discharge cycles a battery can perform before its nominal capacity falls below 80% of its initial rated capacity.

The term "capacity" is a characteristic of an electrochemical cell that refers to the total amount of electrical charge an electrochemical cell, such as a battery, is able to hold. Capacity is typically expressed in units of ampere-hours. The term "specific capacity" refers to the capacity output of an electrochemical cell, such as a battery, per unit weight, usually expressed in Ah/kg or mAh/g.

In the following description, all numbers disclosed herein are approximate values, regardless whether the word "about" or "approximate" is used in connection therewith. They may vary by 1 percent, 2 percent, 5 percent, or, sometimes, 10 to 20 percent. Whenever a numerical range with a lower limit, $R^L$, and an upper limit, $R^U$, is disclosed, any number falling within the range is specifically disclosed. In particular, the following numbers within the range are specifically disclosed: , $R=R^L+k*(R^U-R^L)$ wherein k is a variable ranging from 0 percent to 100 percent. Moreover, any numerical range defined by two R numbers as defined in the above is also specifically disclosed.

In the present description, all references to the singular include references to the plural and vice versa.

A "composite" as described herein refers to a metal substrate with a coating applied on one side or both sides of the metal substrate, of which the metal substrate and the coating can each comprise one or more layers, and wherein the coating comprises a polymeric binder. In some embodiments, the polymeric binder is a copolymer, i.e. a copolymeric binder. FIG. 1 shows a simplified view of the composite, represented by 100. The composite 100 comprises a metal substrate 101 with a coating 102 applied on one side of the metal substrate 101. Applying a coating on a metal substrate, i.e. formation of a composite, is one of the most commonly used techniques in producing an alteration in the surface characteristics of the metal substrate to meeting performance requirements for various applications. Coating has been frequently utilized for various purposes, including protection (e.g. against chemicals, corrosion, scratch and abrasion, etc.), adhesion, wettability modification, or biocompatibility.

Adhesion between the coating and the metal substrate within the composite is attained via the interactions between the polymeric binder comprised in the coating, and the surface of the metal substrate to which the coating is applied on. Copolymeric binders compatible with aqueous solvents, most commonly water, can strongly adhere the coating to the metal substrate. Therefore, the incorporation of such a copolymeric binder is preferred in the present invention. Moreover, since these copolymeric binders are capable of achieving good dispersion and stability in water, water-based coatings comprising these copolymeric binders would hence have good processibility in formation, storage, and utilization.

In some embodiments, the substrate is a metallic substrate. In some embodiments, the substrate is selected from the group consisting of stainless steel, titanium, nickel, aluminum, copper, platinum, gold, silver, chromium, zirconium, tungsten, molybdenum, tin, vanadium, zinc, cadmium, iron, cobalt, lead, and alloys thereof.

Quite often, the metal substrate is exposed to ambient air for a period of time prior to applying a coating on the surface(s) of the metal substrate. Ambient air contains primarily oxygen, water and several organic and inorganic species. Upon exposure of metal substrate to naturally occurring oxygen in the atmosphere, it is inevitable for metal oxide to be developed on the metal substrate surface(s). For example, metallic aluminum is naturally very reactive with atmospheric oxygen, initiating the formation of aluminum oxide on the exposed aluminum surface(s). This aluminum oxide protects the aluminum contained within from undergoing further oxidation and consequently aluminum has good corrosion resistance. As the metal oxide on the surface of the metal substrate comes into contact with moisture in ambient air, hydroxylation of the metal oxide occurs, enriching the surface of the metal oxide with hydroxyl (—OH) groups.

The hydroxyl group at the metal substrate surface consists of a H atom covalently bonded to a more electronegative O atom and an electronegative O atom bearing a lone pair of electrons in the outmost electron shell. Within the hydroxyl group, the hydrogen atom is capable of forming a hydrogen bond with another molecule that contains a highly electronegative atom such as O, N or F, and the oxygen atom is capable of accepting a hydrogen bond from a hydrogen atom of another molecule that is similarly bonded to a highly electronegative atom such as O, N or F.

Meanwhile, metal parts of the substrate are still present on the metal substrate surface are in the form of a partially positively charged metal species ($M^{\delta+}$), for example in the metal oxide developed on the metal substrate surface.

Figure 2:
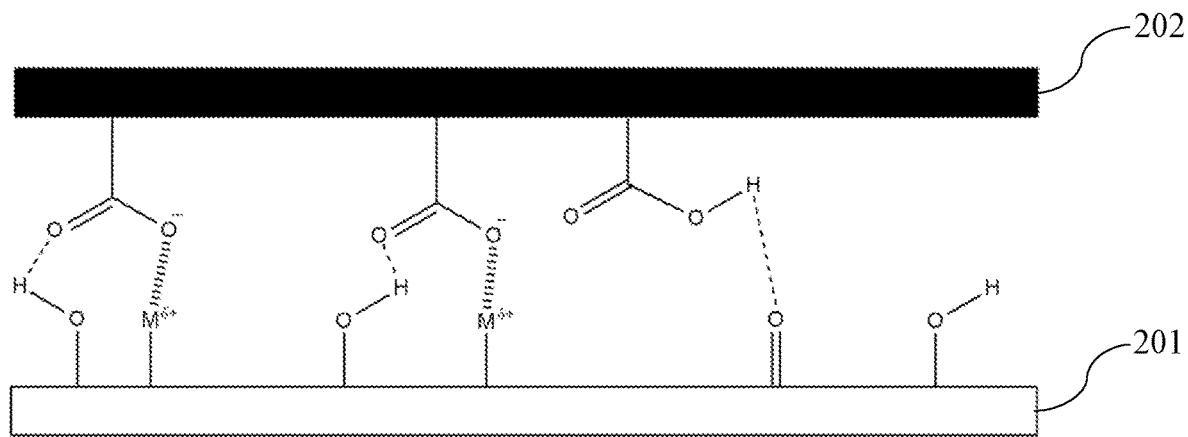
FIG. 2 illustrates a schematic of the proposed coating-metal substrate interfacial structure of a composite.

FIG. 2 illustrates a schematic of the proposed coating-metal substrate interfacial structure of a composite, represented by 200. Hydroxyl (—OH) groups, partially positively charged metal species ($M^{\delta+}$) and oxygen (O) atoms of the metal oxide are present on the surface of the metal substrate 201. The copolymeric binder contained within the coating 202 and/or at the surface of the coating 202 comprises structural units derived from a carboxylic acid group-containing monomer. The structural unit derived from a carboxylic acid group-containing monomer in this case comprises a carboxylic salt group, wherein a carboxylic salt group is a salt of a carboxylic acid group.

Oxygen (O) and hydrogen (H) atoms present in the copolymeric binder are likely to interact with the O and/or H atoms of the hydroxyl groups and the O atom(s) in metal oxide at the metal substrate surface via hydrogen bond formations. In addition, an ion-dipole interaction is exerted between the anion of the carboxylic salt group, $COO^-$ in this case and contained within the copolymeric binder, and the $M^{\delta+}$ species at the metal substrate surface. Accordingly, hydrogen bonding and/or ion-dipole attractions would be formed between coating and metal substrate, and these two types of interactions contribute considerably and significantly to the adhesion of the coating onto the surface of the metal substrate.

The copolymeric binders disclosed herein are formulated to provide an exceptionally strong coating-metal substrate adhesion for various applications. However, the strong adhesion presents an added challenge in the detachment of the coating from its associated metal substrate in the subsequent recycling step as the composite-containing product reaches the end of its usefulness or lifespan or as the product rejects are generated during production.

Delamination of the coating from the metal substrate in the composite is accomplished via bond disruption and/or breakage between the copolymeric binder comprised in the coating, and the metal substrate surface. Copolymers of different compositions that display varying specific properties would require different approaches to separate the coating from the metal substrate. Accordingly, the method of the present invention is specifically developed to delaminate a composite by disrupting and/or breaking the bonds between the aqueous copolymeric binders disclosed herein and a metal substrate surface.

The present invention provides a method for delaminating a composite by immersing the composite into a delamination solution; wherein the composite comprises a metal substrate and a coating applied on one side or both sides of the metal substrate, wherein the coating comprises a copolymeric binder.

In some embodiments, delamination of the composite occurs along the coating-metal substrate interface.

In some embodiments, the delamination solution comprises a delamination agent and an aqueous solvent. In some embodiments, the delamination agent is a water-soluble weak base. In some embodiments, the aqueous solvent consists solely of water.

Within the delamination solution, the weak base reacts with water to form hydroxide ions. These ions generated could enter the interface between the copolymeric binder and the metal substrate surface. The ions would disrupt the hydrogen bonding and ion-dipole interactions between the binder and the substrate. The aqueous solvent (e.g. water) present in the delamination solution also brings about disruption to the ion-dipole interactions between the copolymeric binder in the coating and the metal substrate surface. These aqueous solvent molecules further act to solvate the copolymer, creating solvation shells (hydration shells in the case of water), which severely diminishes the strength of electrostatic interactions between the copolymeric binder of the coating and the metal substrate.

In some embodiments, some functional groups within the copolymer capable of dissociating in water, such as carboxylic acid groups, are not completely dissociated in water. The hydroxide ions generated by the weak base reacting with water, or the weak base itself, would further act to neutralize the undissociated functional groups, resulting in the formation of the corresponding anion, such as the carboxylate anion when the carboxylic acid functional group is present. Attraction of water to such an anion, for example carboxylate, is stronger than the attraction of water to the undissociated functional group. With the ionization of these dissociable functional groups, the greater solvation effects of the ionized functional groups in water would hence result in a more effective reduction in interactions between polymer and substrate. This thus leads to coating delamination.

Furthermore, since the base is a weak base, the rate of corrosion of the metallic substrate due to reaction with the base or the hydroxide generated by the base reacting with water would be kept low, ensuring a good rate of recovery.

Therefore, the method disclosed herein of the present invention is directed towards achieving delamination of a composite by disrupting and/or breaking the hydrogen and/or ion-dipole interactions between a coating and a metal substrate surface via the use of a delamination solution, wherein the coating comprises a copolymeric binder. The method is simple and does not require the involvement of complex separation processes. The proposed method ensures complete delamination of composite at the coating-metal substrate interface with no contamination of metal substrate which enables exceptional materials recovery, and allows the delamination of composite to be achieved with high efficiency and speed.

Non-ionized copolymer functional groups do not interact with the metal substrate surface via ion-dipole interactions. The use of aqueous solvent alone as the delamination solution may be insufficient in completely delaminating the coating from the metal substrate as solvation of the aqueous solvent on these non-ionized copolymer functional groups would be noticeably lower; and the interactions, mostly hydrogen bonding, between these copolymer functional groups within the coating and the metal substrate surface would often not be disrupted and diminished to an extent where complete delamination of the composite is made possible.

Therefore, both delamination agent and aqueous solvent are to be used in conjunction as the delamination solution to achieve superior delamination performance of the composite. In some embodiments, the delamination solution comprises a delamination agent and an aqueous solvent.

In some embodiments, the delamination agent is a weak base. In some embodiments, the weak base is an inorganic base. In some embodiments, the weak base is an organic base. In some embodiments, the inorganic base constituting the delamination agent is sodium carbonate, potassium carbonate, lithium carbonate, rubidium carbonate, cesium carbonate, ammonia, or combinations thereof. In some embodiments, the organic base constituting the delamination agent is methylamine, dimethylamine, trimethylamine, ethylamine, diethylamine, triethylamine, propylamine, isopropylamine, dipropylamine, diisopropyl amine, isopropyl ethylamine, diisopropylethylamine, n-butylamine, isobutylamine, di n-butylamine, diisobutylamine, tributylamine, tert-butyl amine, pyridine, piperidine, 4-dimethylaminopyridine (DMAP), 1,8-diazabicyclo[5.4.0]undec-7-ene (DBU), 1,5-diazabicyclo[4.3.0]non-5-ene (DBN), N-methylmorpholine (NMM), 1,4-diazabicyclo[2.2.2]octane (DABCO), 2,6-lutidine, or combinations thereof. In some embodiments, the delamination agent is a combination of inorganic base and organic base.

In some embodiments, the aqueous solvent is a solution containing water as the major component and a volatile solvent, such as alcohols, lower aliphatic ketones, lower alkyl acetates or the like, as the minor component in addition to water. In some embodiments, the proportion of water in the aqueous solvent is from about 51% to about 100%, from about 51% to about 95%, from about 51% to about 90%, from about 51% to about 85%, from about 51% to about 80%, from about 51% to about 75%, from about 51% to about 70%, from about 55% to about 100%, from about 55% to about 95%, from about 55% to about 90%, from about 55% to about 85%, from about 55% to about 80%, from about 60% to about 100%, from about 60% to about 95%, from about 60% to about 90%, from about 60% to about 85%, from about 60% to about 80%, from about 65% to about 100%, from about 65% to about 95%, from about 65% to about 90%, from about 65% to about 85%, from about 70% to about 100%, from about 70% to about 95%, from about 70% to about 90%, from about 70% to about 85%, from about 75% to about 100%, from about 75% to about 95% or from about 80% to about 100% by weight.

In some embodiments, the proportion of water in the aqueous solvent is more than 50%, more than 55%, more than 60%, more than 65%, more than 70%, more than 75%, more than 80%, more than 85%, more than 90% or more than 95% by weight. In some embodiments, the proportion of water in the aqueous solvent is less than 55%, less than 60%, less than 65%, less than 70%, less than 75%, less than 80%, less than 85%, less than 90% or less than 95% by weight. In some embodiments, the aqueous solvent consists solely of water, that is, the proportion of water in the aqueous solvent is 100% by weight.

Some non-limiting examples of water include tap water, bottled water, purified water, pure water, distilled water, DI water, $D_2O$, and combinations thereof. In some embodiments, the aqueous solvent is de-ionized water. Water may be applied as part of the delamination solution to form solvation shells around the copolymeric binder of the coating and the metal substrate surface at the coating-metal substrate surface interface. This helps to disrupt the interactions between the copolymeric binder in the coating and the metal substrate surface and consequently gives rise to the complete delamination of the composite.

Any water-miscible solvents or volatile solvents can be used as the minor component (i.e. solvents other than water) of the aqueous solvent. Some non-limiting examples of the water-miscible solvents or volatile solvents include alcohols, lower aliphatic ketones, lower alkyl acetates, and combinations thereof. The addition of alcohol can improve the solubility of the delamination agent and lower the freezing point of water. Some non-limiting examples of the alcohol include $C_1$-$C_4$ alcohols, such as methanol, ethanol, isopropanol, n-propanol, tert-butanol, n-butanol, and combinations thereof. Some non-limiting examples of the lower aliphatic ketones include acetone, dimethyl ketone, methyl ethyl ketone (MEK), and combinations thereof. Some non-limiting examples of the lower alkyl acetates include ethyl acetate (EA), isopropyl acetate, propyl acetate, butyl acetate (BA), and combinations thereof. In some embodiments, the aqueous solvent does not comprise an alcohol, a lower aliphatic ketone, a lower alkyl acetate, or combinations thereof.

Surfactants have been used as additives to delamination solutions in order to improve the rate of delamination. However, the addition of surfactants to the delamination solution would constitute impurities in the resultant solutions, resulting in reduced product purity or otherwise requiring time and capital in developing a separation system to remove the surfactants. In addition, surfactants are harmful to the environment when released, and some may additionally pose health risks. Therefore, in some embodiments, no surfactant is added to the delamination solution. In some embodiments, the delamination solution is free of cationic surfactant, anionic surfactant, nonionic surfactant, and amphoteric surfactant.

In some embodiments, no anionic surfactants including fatty acid salts; alkyl sulfates; polyoxyalkylene alkyl ether acetates; alkylbenzene sulfonates; polyoxyalkylene alkyl ether sulfates; higher fatty acid amide sulfonates; N-acylsarcosin salts; alkyl phosphates; polyoxyalkylene alkyl ether phosphate salts; long-chain sulfosuccinates; long-chain N-acylglutamates; polymers and copolymers comprising acrylic acids, anhydrides, esters, vinyl monomers and/or olefins and their alkali metal, alkaline earth metal and/or ammonium salt derivatives; salts of polycarboxylic acids; formalin condensate of naphthalene sulfonic acid; alkyl naphthalene sulfonic acid; naphthalene sulfonic acid; alkyl naphthalene sulfonate; formalin condensates of acids and naphthalene sulfonates such as their alkali metal salts, alkaline earth metal salts, ammonium salts or amine salts; melamine sulfonic acid; alkyl melamine sulfonic acid; formalin condensate of melamine sulfonic acid; formalin condensate of alkyl melamine sulfonic acid; alkali metal salts, alkaline earth metal salts, ammonium salts and amine salts of melamine sulfonates; lignin sulfonic acid; and alkali metal salts, alkaline earth metal salts, ammonium salts and amine salts of lignin sulfonates are added to the delamination solution.

In some embodiments, no cationic surfactants including alkyltrimethylammonium salts such as stearyltrimethylammonium chloride, lauryltrimethylammonium chloride and cetyltrimethylammonium bromide; dialkyldimethylammonium salts; trialkylmethylammonium salts; tetraalkylammonium salts; alkylamine salts; benzalkonium salts; alkylpyridinium salts; and imidazolium salts are added to the delamination solution.

In some embodiments, no nonionic surfactants including polyoxyalkylene oxide-added alkyl ethers; polyoxyalkylene styrene phenyl ethers; polyhydric alcohols; ester compounds of monovalent fatty acid; polyoxyalkylene alkylphenyl ethers; polyoxyalkylene fatty acid ethers; polyoxyalkylene sorbitan fatty acid esters; glycerin fatty acid esters; polyoxyalkylene castor oil; polyoxyalkylene hydrogenated castor oil; polyoxyalkylene sorbitol fatty acid ester; polyglycerin fatty acid ester; alkyl glycerin ether; polyoxyalkylene cholesteryl ether; alkyl polyglucoside; sucrose fatty acid ester; polyoxyalkylene alkyl amine; polyoxyethylene-polyoxypropylene block polymers; sorbitan fatty acid ester; and fatty acid alkanolamides are added to the delamination solution.

In some embodiments, no amphoteric surfactants including 2-undecyl-N, N-(hydroxyethylcarboxymethyl)-2-imidazoline sodium salt, 2-cocoyl-2-imidazolinium hydroxide-1-carboxyethyloxy disodium salt; imidazoline-based amphoteric surfactants; 2-heptadecyl-N-carboxymethyl-N-hydroxyethyl imidazolium betaine, lauryldimethylaminoacetic acid betaine, alkyl betaine, amide betaine, sulfobetaine and other betaine-based amphoteric surfactants; N-laurylglycine, N-lauryl β-alanine, N-stearyl β-alanine, lauryl dimethylamino oxide, oleyl dimethylamino oxide, sodium lauroyl glutamate, lauryl dimethylaminoacetic acid betaine, stearyl dimethylaminoacetic acid betaine, cocamidopropyl hydroxysultaine, and 2-alkyl-N-carboxymethyl-N-hydroxyethylimidazolinium betaine are added to the delamination solution.

In some embodiments, the composite comprises a metal substrate and a coating applied on one side or both sides of the metal substrate.

In some embodiments, the coating comprises a polymeric binder. The intention of the polymeric binder in the coating is to provide adhesion between the coating and the metal substrate within the composite. In some embodiments, the polymeric binder comprises an aqueous copolymer.

In some embodiments, the copolymer comprises a structural unit (a), wherein structural unit (a) is derived from a monomer selected from the group consisting of carboxylic acid group-containing monomer, carboxylic acid salt group-containing monomer, sulfonic acid group-containing monomer, sulfonic acid salt group-containing monomer, phosphonic acid group-containing monomer, phosphonic acid salt group-containing monomer, and combinations thereof. In some embodiments, an acid salt group is a salt of an acid group. In some embodiments, an acid salt group-containing monomer comprises an alkali metal cation. Examples of an alkali metal forming the alkali metal cation include lithium, sodium, and potassium. In some embodiments, an acid salt group-containing monomer comprises an ammonium cation. In some embodiments, structural unit (a) may comprise a combination of a monomer containing a salt group and a monomer containing an acid group.

In some embodiments, the carboxylic acid group-containing monomer is acrylic acid, methacrylic acid, crotonic acid, 2-butyl crotonic acid, cinnamic acid, maleic acid, maleic anhydride, fumaric acid, itaconic acid, itaconic anhydride, tetraconic acid, or combinations thereof. In certain embodiments, the carboxylic acid group-containing monomer is 2-ethylacrylic acid, isocrotonic acid, cis-2-pentenoic acid, trans-2-pentenoic acid, angelic acid, tiglic acid, 3,3-dimethyl acrylic acid, 3-propyl acrylic acid, trans-2-methyl-3-ethyl acrylic acid, cis-2-methyl-3-ethyl acrylic acid, 3-isopropyl acrylic acid, trans-3-methyl-3-ethyl acrylic acid, cis-3-methyl-3-ethyl acrylic acid, 2-isopropyl acrylic acid, trimethyl acrylic acid, 2-methyl-3,3-diethyl acrylic acid, 3-butyl acrylic acid, 2-butyl acrylic acid, 2-pentyl acrylic acid, 2-methyl-2-hexenoic acid, trans-3-methyl-2-hexenoic acid, 3-methyl-3-propyl acrylic acid, 2-ethyl-3-propyl acrylic acid, 2,3-diethyl acrylic acid, 3,3-diethyl acrylic acid, 3-methyl-3-hexyl acrylic acid, 3-methyl-3-tert-butyl acrylic acid, 2-methyl-3-pentyl acrylic acid, 3-methyl-3-pentyl acrylic acid, 4-methyl hexenoic acid, 4-ethyl-2-hexenoic acid, 3-methyl-2-ethyl-2-hexenoic acid, 3-tert-butyl acrylic acid, 2,3-dimethyl-3-ethyl acrylic acid, 3,3-dimethyl-2-ethyl acrylic acid, 3-methyl-3-isopropyl acrylic acid, 2-methyl-3-isopropyl acrylic acid, trans-2-octenoic acid, cis-2-octenoic acid, trans-2-decenoic acid, α-acetoxyacrylic acid, β-trans-aryloxyacrylic acid, α-chloro-β-E-methoxyacrylic acid, or combinations thereof. In some embodiments, the carboxylic acid group-containing monomer is methyl maleic acid, dimethyl maleic acid, phenyl maleic acid, bromo maleic acid, chloromaleic acid, dichloromaleic acid, fluoromaleic acid, difluoro maleic acid, nonyl hydrogen maleate, decyl hydrogen maleate, dodecyl hydrogen maleate, octadecyl hydrogen maleate, fluoroalkyl hydrogen maleate, or combinations thereof. In some embodiments, the carboxylic acid group-containing monomer is maleic anhydride, methyl maleic anhydride, dimethyl maleic anhydride, acrylic anhydride, methacrylic anhydride, methacrolein, methacryloyl chloride, methacryloyl fluoride, methacryloyl bromide, or combinations thereof.

In some embodiments, the carboxylic acid salt group-containing monomer is acrylic acid salt, methacrylic acid salt, crotonic acid salt, 2-butyl crotonic acid salt, cinnamic acid salt, maleic acid salt, maleic anhydride salt, fumaric acid salt, itaconic acid salt, itaconic anhydride salt, tetraconic acid salt, or combinations thereof. In certain embodiments, the carboxylic salt group-containing monomer is 2-ethylacrylic acid salt, isocrotonic acid salt, cis-2-pentenoic acid salt, trans-2-pentenoic acid salt, angelic acid salt, tiglic acid salt, 3,3-dimethyl acrylic acid salt, 3-propyl acrylic acid salt, trans-2-methyl-3-ethyl acrylic acid salt, cis-2-methyl-3-ethyl acrylic acid salt, 3-isopropyl acrylic acid salt, trans-3-methyl-3-ethyl acrylic acid salt, cis-3-methyl-3-ethyl acrylic acid salt, 2-isopropyl acrylic acid salt, trimethyl acrylic acid salt, 2-methyl-3,3-diethyl acrylic acid salt, 3-butyl acrylic acid salt, 2-butyl acrylic acid salt, 2-pentyl acrylic acid salt, 2-methyl-2-hexenoic acid salt, trans-3-methyl-2-hexenoic acid salt, 3-methyl-3-propyl acrylic acid salt, 2-ethyl-3-propyl acrylic acid salt, 2,3-diethyl acrylic acid salt, 3,3-diethyl acrylic acid salt, 3-methyl-3-hexyl acrylic acid salt, 3-methyl-3-tert-butyl acrylic acid salt, 2-methyl-3-pentyl acrylic acid salt, 3-methyl-3-pentyl acrylic acid salt, 4-methyl-2-hexenoic acid salt, 4-ethyl-2-hexenoic acid salt, 3-methyl-2-ethyl-2-hexenoic acid salt, 3-tert-butyl acrylic acid salt, 2,3-dimethyl-3-ethyl acrylic acid salt, 3,3-dimethyl-2-ethyl acrylic acid salt, 3-methyl-3-isopropyl acrylic acid salt, 2-methyl-3-isopropyl acrylic acid salt, trans-2-octenoic acid salt, cis-2-octenoic acid salt, trans-2-decenoic acid salt, α-acetoxyacrylic acid salt, β-trans-aryloxyacrylic acid salt, α-chloro-β-E-methoxyacrylic acid salt, or combinations thereof. In some embodiments, the carboxylic salt group-containing monomer is methyl maleic acid salt, dimethyl maleic acid salt, phenyl maleic acid salt, bromo maleic acid salt, chloromaleic acid salt, dichloromaleic acid salt, fluoromaleic acid salt, difluoro maleic acid salt, or combinations thereof.

In some embodiments, the sulfonic acid group-containing monomer is vinylsulfonic acid, methylvinylsulfonic acid, allylvinylsulfonic acid, allylsulfonic acid, methallylsulfonic acid, styrenesulfonic acid, 2-sulfoethyl methacrylic acid, 2-methylprop-2-ene-1-sulfonic acid, 2-acrylamido-2-methyl-1-propane sulfonic acid, 3-allyloxy-2-hydroxy propane sulfonic acid, allyl hydrogensulfate, vinyl hydrogensulfate, or combinations thereof.

In some embodiments, the sulfonic acid salt group-containing monomer is vinylsulfonic acid salt, methylvinylsulfonic acid salt, allylvinylsulfonic acid salt, allylsulfonic acid salt, methallylsulfonic acid salt, styrenesulfonic acid salt, 2-sulfoethyl methacrylic acid salt, 2-methylprop-2-ene-1-sulfonic acid salt, 2-acrylamido-2-methyl-1-propane sulfonic acid salt, 3-allyloxy-2-hydroxy-1-propane sulfonic acid salt, allyl sulfate salt, vinyl sulfate salt, or combinations thereof.

In some embodiments, the phosphonic acid group-containing monomer is vinyl phosphonic acid, allyl phosphonic acid, vinyl benzyl phosphonic acid, acrylamide alkyl phosphonic acid, methacrylamide alkyl phosphonic acid, acrylamide alkyl diphosphonic acid, acryloylphosphonic acid, 2-methacryloyloxyethyl phosphonic acid, bis(2-methacryloyloxyethyl) phosphonic acid, ethylene 2-methacryloyloxyethyl phosphonic acid, ethyl-methacryloyloxyethyl phosphonic acid, allyl hydrogenphosphate, vinyl hydrogenphosphate, or combinations thereof.

In some embodiments, the phosphonic acid salt group-containing monomer is salt of vinyl phosphonic acid, salt of allyl phosphonic acid, salt of vinyl benzyl phosphonic acid, salt of acrylamide alkyl phosphonic acid, salt of methacrylamide alkyl phosphonic acid, salt of acrylamide alkyl diphosphonic acid, salt of acryloylphosphonic acid, salt of 2-methacryloyloxyethyl phosphonic acid, salt of bis(2-methacryloyloxyethyl) phosphonic acid, salt of ethylene 2-methacryloyloxyethyl phosphonic acid, salt of ethyl-methacryloyloxyethyl phosphonic acid, allyl phosphate salt, vinyl phosphate salt, or combinations thereof.

In some embodiments, the proportion of structural unit (a) within the copolymer is from about 40% to about 80%, from about 45% to about 80%, from about 47.5% to about 80%, from about 50% to about 80%, from about 52.5% to about 80%, from about 55% to about 80%, from about 57.5% to about 80%, from about 60% to about 80%, from about 62.5% to about 80%, from about 65% to about 80%, from about 40% to about 70%, from about 42.5% to about 70%, from about 45% to about 70%, from about 47.5% to about 70%, from about 50% to about 70%, from about 52.5% to about 70%, from about 55% to about 70%, from about 57.5% to about 70%, from about 60% to about 70%, from about 40% to about 65%, from about 42.5% to about 65%, from about 45% to about 65%, from about 47.5% to about 65%, from about 50% to about 65%, from about 52.5% to about 65%, from about 55% to about 65%, from about 40% to about 60%, from about 42.5% to about 60%, from about 45% to about 60%, from about 47.5% to about 60%, from about 50% to about 60%, from about 40% to about 55%, from about 42.5% to about 55%, or from about 45% to about 55% by mole, based on the total number of moles of monomeric units in the copolymeric binder.

In some embodiments, the proportion of structural unit (a) within the copolymer is less than 80%, less than 77.5%, less than 75%, less than 72.5%, less than 70%, less than 67.5%, less than 65%, less than 62.5%, less than 60%, less than 57.5%, less than 55%, less than 52.5%, less than 50%, less than 47.5%, or less than 45% by mole, based on the total number of moles of monomeric units in the copolymeric binder. In some embodiments, the proportion of structural unit (a) within the copolymer is more than 40%, more than 42.5%, more than 45%, more than 47.5%, more than 50%, more than 52.5%, more than 55%, more than 57.5%, more than 60%, more than 62.5%, more than 65%, more than 67.5%, more than 70%, more than 72.5%, or more than 75% by mole, based on the total number of moles of monomeric units in the copolymeric binder.

In some embodiments, the copolymer additionally comprises a structural unit (b), derived from a monomer selected from the group consisting of an amide group-containing monomer, a hydroxyl group-containing monomer, and combinations thereof.

In some embodiments, the amide group-containing monomer is acrylamide, methacrylamide, N-methyl methacrylamide, N-ethyl methacrylamide, N-n-propyl methacrylamide, N-isopropyl methacrylamide, isopropyl acrylamide, N-n-butyl methacrylamide, N-isobutyl methacrylamide, N,N-dimethyl acrylamide, N,N-dimethyl methacrylamide, N,N-diethyl acrylamide, N,N-diethyl methacrylamide, N-methylol methacrylamide, N-(methoxymethyl)methacrylamide, N-(ethoxymethyl)methacrylamide, N-(propoxymethyl)methacrylamide, N-(butoxymethyl)methacrylamide, N,N-dimethylaminopropyl methacrylamide, N,N-dimethylaminoethyl methacrylamide, N,N-dimethylol methacrylamide, diacetone methacrylamide, diacetone acrylamide, methacryloyl morpholine, N-hydroxyl methacrylamide, N-methoxymethyl acrylamide, N-methoxymethyl methacrylamide, N,N'-methylene-bis-acrylamide (MBA), N-hydroxymethyl acrylamide, or combinations thereof.

In some embodiments, the hydroxyl group-containing monomer is a $C_1$ to $C_{20}$ alkyl group or a $C_5$ to $C_{20}$ cycloalkyl group-containing methacrylate having a hydroxyl group. In some embodiments, the hydroxyl group-containing monomer is 2-hydroxyethylacrylate, 2-hydroxyethyl methacrylate, 2-hydroxypropyl acrylate, 2-hydroxypropyl methacrylate, 2-hydroxybutyl methacrylate, 3-hydroxypropylacrylate, 3-hydroxypropylmethacrylate, 4-hydroxybutyl methacrylate, 5-hydroxypentylacrylate, 6-hydroxyhexyl methacrylate, 1,4-cyclohexanedimethanol mono(meth)acrylate, 3-chloro-2-hydroxypropyl methacrylate, diethylene glycol mono(meth)acrylate, allyl alcohol, or combinations thereof.

In some embodiments, the proportion of structural unit (b) within the copolymer is from about 10% to about 35%, from about 12.5% to about 35%, from about 15% to about 35%, from about 17.5% to about 35%, from about 20% to about 35%, from about 22.5% to about 35%, from about 25% to about 35%, from about 27.5% to about 35%, from about 30% to about 35%, from about 10% to about 30%, from about 12.5% to about 30%, from about 15% to about 30%, from about 17.5% to about 30%, from about 20% to about 30%, from about 22.5% to about 30%, from about 25% to about 30%, from about 10% to about 25%, from about 12.5% to about 25%, or from about 15% to about 25% by mole, based on the total number of moles of monomeric units in the copolymeric binder.

In some embodiments, the proportion of structural unit (b) within the copolymer is less than 35%, less than 32.5%, less than 30%, less than 27.5%, less than 25%, less than 22.5%, less than 20%, less than 17.5%, or less than 15% by mole, based on the total number of moles of monomeric units in the copolymeric binder. In some embodiments, the proportion of structural unit (b) within the copolymer is more than 10%, more than 12.5%, more than 15%, more than 17.5%, more than 20%, more than 22.5%, more than 25%, more than 27.5%, or more than 30% by mole, based on the total number of moles of monomeric units in the copolymeric binder.

In some embodiments, the copolymer additionally comprises a structural unit (c), derived from a monomer selected from the group consisting of a nitrile group-containing monomer, ester group-containing monomer, epoxy group-containing monomer, a fluorine-containing monomer, and combinations thereof.

In some embodiments, the nitrile group-containing monomer includes α,β-ethylenically unsaturated nitrile monomers. In some embodiments, the nitrile group-containing monomer is acrylonitrile, α-halogenoacrylonitrile, α-alkylacrylonitrile, or combinations thereof. In some embodiments, the nitrile group-containing monomer is α-chloroacrylonitrile, α-bromoacrylonitrile, α-fluoroacrylonitrile, methacrylonitrile, α-ethylacrylonitrile, α-isopropylacrylonitrile, α-n-hexylacrylonitrile, α-methoxyacrylonitrile, 3-methoxyacrylonitrile, 3-ethoxyacrylonitrile, α-acetoxyacrylonitrile, α-phenylacrylonitrile, α-tolylacrylonitrile, α-(methoxyphenyl)acrylonitrile, α-(chlorophenyl)acrylonitrile, α-(cyanophenyl)acrylonitrile, vinylidene cyanide, or combinations thereof.

In some embodiments, the ester group-containing monomer is $C_1$ to $C_{20}$ alkyl acrylate, $C_1$ to $C_{20}$ alkyl (meth)acrylate, cycloalkyl acrylate, or combinations thereof. In some embodiments, the ester group-containing monomer is methyl acrylate, ethyl acrylate, n-propyl acrylate, isopropyl acrylate, n-butyl acrylate, sec-butyl acrylate, tert-butyl acrylate, pentyl acrylate, hexyl acrylate, heptyl acrylate, octyl acrylate, 3,3,5-trimethylhexyl acrylate, 2-ethylhexyl acrylate, nonyl acrylate, decyl acrylate, lauryl acrylate, n-tetradecyl acrylate, oxtadecyl acrylate, cyclohexyl acrylate, phenyl acrylate, methoxymethyl acrylate, methoxyethyl acrylate, ethoxymethyl acrylate, ethoxyethyl acrylate, perfluorooctyl acrylate, stearyl acrylate, or combinations thereof. In some embodiments, the ester group-containing monomer is cyclohexyl acrylate, cyclohexyl methacrylate, isobornyl acrylate, isobornyl methacrylate, 3,3,5-trimethylcyclohexylacrylate, or combinations thereof. In some embodiments, the ester group-containing monomer is methyl methacrylate, ethyl methacrylate, n-propyl methacrylate, isopropyl methacrylate, n-butyl methacrylate, sec-butyl methacrylate, tert-butyl methacrylate, isobutyl methacrylate, n-pentyl methacrylate, isopentyl methacrylate, hexyl methacrylate, heptyl methacrylate, octyl methacrylate, 2-ethylhexyl methacrylate, nonyl methacrylate, decyl methacrylate, lauryl methacrylate, n-tetradecyl methacrylate, stearyl methacrylate, 2,2,2-trifluoroethyl methacrylate, phenyl methacrylate, benzyl methacrylate, or combinations thereof.

In some embodiments, the epoxy group-containing monomer is vinyl glycidyl ether, allyl glycidyl ether, allyl 2,3-epoxypropyl ether, butenyl glycidyl ether, butadiene monoepoxide, chloroprene monoepoxide, 3,4-epoxy-1-butene, 4,5-epoxy-2-pentene, 3,4-epoxy-1-vinylcyclohexane, 1,2-epoxy-4-vinylcyclohexane, 3,4-epoxy cyclohexylethylene, epoxy-4-vinylcyclohexene, 1,2-epoxy-5,9-cyclododecadiene, or combinations thereof.

In some embodiments, the epoxy group-containing monomer is 3,4-epoxy-1-butene, 1,2-epoxy-5-hexene, 1,2-epoxy-9-decene, glycidyl acrylate, glycidyl methacrylate, glycidyl crotonate, glycidyl 2,4-dimethyl pentenoate, glycidyl 4-hexenoate, glycidyl 4-heptenoate, glycidyl 5-methyl-4-heptenoate, glycidyl sorbate, glycidyl linoleate, glycidyl oleate, glycidyl 3-butenoate, glycidyl 3-pentenoate, glycidyl-4-methyl-3-pentenoate, or combinations thereof.

In some embodiments, the fluorine-containing monomer is a $C_1$ to $C_{20}$ alkyl group-containing acrylate, methacrylate, or combinations thereof, wherein the monomer comprises at least one fluorine atom. In some embodiments, the fluorine-containing monomer is perfluoro alkyl acrylate such as perfluoro dodecyl acrylate, perfluoro n-octyl acrylate, perfluoro n-butyl acrylate, perfluoro hexylethyl acrylate and perfluoro octylethyl acrylate; perfluoro alkyl methacrylate such as perfluoro dodecyl methacrylate, perfluoro n-octyl methacrylate, perfluoro n-butyl methacrylate, perfluoro hexylethyl methacrylate and perfluoro octylethyl methacrylate; perfluoro oxyalkyl acrylate such as perfluoro dodecyloxyethyl acrylate and perfluoro decyloxyethyl acrylate; perfluoro oxyalkyl methacrylate such as perfluoro dodecyloxyethyl methacrylate and perfluoro decyloxyethyl methacrylate, or combinations thereof. In some embodiments, the fluorine-containing monomer is a carboxylate containing at least one $C_1$ to $C_{20}$ alkyl group and at least one fluorine atom; wherein the carboxylate is selected from the group consisting of crotonate, malate, fumarate, itaconate, or combinations thereof. In some embodiments, the fluorine-containing monomer is vinyl fluoride, trifluoroethylene, trifluorochloroethylene, fluoroalkyl vinyl ether, perfluoroalkyl vinyl ether, hexafluoropropylene, 2,3,3,3-tetrafluoropropene, vinylidene fluoride, tetrafluoroethylene, 2-fluoro acrylate, or combinations thereof.

In some embodiments, the proportion of structural unit (c) within the copolymer is from about 10% to about 35%, from about 12.5% to about 35%, from about 15% to about 35%, from about 17.5% to about 35%, from about 20% to about 35%, from about 22.5% to about 35%, from about 25% to about 35%, from about 27.5% to about 35%, from about 30% to about 35%, from about 10% to about 30%, from about 12.5% to about 30%, from about 15% to about 30%, from about 17.5% to about 30%, from about 20% to about 30%, from about 22.5% to about 30%, from about 25% to about 30%, from about 10% to about 25%, from about 12.5% to about 25%, or from about 15% to about 25% by mole, based on the total number of moles of monomeric units in the copolymeric binder.

In some embodiments, the proportion of structural unit (c) within the copolymer is less than 35%, less than 32.5%, less than 30%, less than 27.5%, less than 25%, less than 22.5%, less than 20%, less than 17.5%, or less than 15% by mole, based on the total number of moles of monomeric units in the copolymeric binder. In some embodiments, the proportion of structural unit (c) within the copolymer is more than 10%, more than 12.5%, more than 15%, more than 17.5%, more than 20%, more than 22.5%, more than 25%, more than 27.5%, or more than 30% by mole, based on the total number of moles of monomeric units in the copolymeric binder.

In other embodiments, the copolymer may additionally comprise a structural unit derived from an olefin. Any hydrocarbon that has at least one carbon-carbon double bond may be used as an olefin without any specific limitations. In some embodiments, the olefin includes a $C_2$ to $C_{20}$ aliphatic compound, a $C_8$ to $C_{20}$ aromatic compound or a cyclic compound containing vinylic unsaturation, a $C_4$ to $C_{40}$ diene, and combinations thereof. In some embodiments, the olefin is styrene, ethylene, propylene, isobutylene, 1-butene, 1-pentene, 1-hexene, 1-heptene, 1-octene, 1-nonene, 1-decene, 1-dodecene, 1-tetradecene, 1-hexadecene, 1-octadecene, 1-eicosene, 3-methyl-1-butene, cyclobutene, 3-methyl-1-pentene, 4-methyl-1-pentene, 4,6-dimethyl-1-heptene, 4-vinylcyclohexene, vinyl cyclohexane, norbornene, norbornadiene, ethylidene norbornene, cyclopentene, cyclohexene, dicyclopentadiene, cyclooctene, or combinations thereof. In some embodiments, the copolymer does not comprise a structural unit derived from an olefin. In some embodiments, the copolymer does not comprise a structural unit derived from styrene, ethylene, propylene, isobutylene, 1-butene, 1-pentene, 1-hexene, 1-heptene, 1-octene, 1-nonene, 1-decene, 1-dodecene, 1-tetradecene, 1-hexadecene, 1-octadecene, 1-eicosene, 3-methyl-1-butene, cyclobutene, 3-methyl-1-pentene, 4-methyl-1-pentene, 4,6-dimethyl-1-heptene, 4-vinylcyclohexene, vinyl cyclohexane, norbornene, norbornadiene, ethylidene norbornene, cyclopentene, cyclohexene, dicyclopentadiene or cyclooctene.

A conjugated diene group-containing monomer constitutes as an olefin. In some embodiments, a conjugated diene group-containing monomer includes $C_4$ to $C_{40}$ dienes; aliphatic conjugated diene monomers such as 1,3-butadiene, 1,3-pentadiene, 1,4-hexadiene, 1,5-hexadiene, 1,7-octadiene, 1,9-decadiene, isoprene, myrcene, 2-methyl-1,3-butadiene, 2,3-dimethyl-1,3-butadiene, 2-chloro-1,3-butadiene; substituted linear conjugated pentadienes; substituted side chain conjugated hexadienes; or combinations thereof. In some embodiments, the copolymer does not comprise a structural unit derived from $C_4$ to $C_{40}$ dienes; aliphatic conjugated diene monomers such as 1,3-butadiene, 1,3-pentadiene, 1,4-hexadiene, 1,5-hexadiene, 1,7-octadiene, 1,9-decadiene, isoprene, myrcene, 2-methyl-1,3-butadiene, 2,3-dimethyl-1,3-butadiene, 2-chloro-1,3-butadiene; substituted linear conjugated pentadienes; or substituted side chain conjugated hexadienes.

In other embodiments, the copolymer may additionally comprise a structural unit derived from an aromatic vinyl group-containing monomer. In some embodiments, the aromatic vinyl group-containing monomer is styrene, α-methylstyrene, vinyltoluene, divinylbenzene, or combinations thereof. In some embodiments, the copolymer does not comprise a structural unit derived from an aromatic vinyl group-containing monomer. In some embodiments, the copolymer does not comprise a structural unit derived from styrene, α-methylstyrene, vinyltoluene or divinylbenzene.

In some embodiments, the metal substrate can be in the form of a foil, sheet or film. In some embodiments, the metal substrate is selected from the group consisting of stainless steel, titanium, nickel, aluminum, copper, platinum, gold, silver, chromium, zirconium, tungsten, molybdenum, tin, vanadium, zinc, cadmium, iron, cobalt, lead, and alloys thereof. In some embodiments, the metal substrate can comprise two or more layers, wherein the material of each layer is selected from the group consisting of stainless steel, titanium, nickel, aluminum, copper, platinum, gold, silver, chromium, zirconium, tungsten, molybdenum, tin, vanadium, zinc, cadmium, iron, cobalt, lead, and alloys thereof. In some embodiments, the metal substrate has a two-layered structure. In some embodiments, the metal substrate has three or more layers. In some embodiments, the metal substrate only has one layer. In some embodiments, the materials of each layer in the metal substrate are the same. In some embodiments, the materials of each layer in the metal substrate are different, or partially different.

In some embodiments, when the metal substrate comprises more than one layer, the metal substrate comprises a layer of insulating material. In some embodiments, the insulating material is a polymeric material selected from the group consisting of polycarbonate, polyacrylate, polyacrylonitrile, polyester, polyamide, polystyrene, polyurethane, polyepoxy, poly(acrylonitrile butadiene styrene), polyimide, polyolefin, polyethylene, polypropylene, polyphenylene sulfide, poly(vinyl ester), polyvinyl chloride, polyether, polyphenylene oxide, cellulose polymer, and combinations thereof. When the metal substrate comprises a layer of insulating material, the coating is coated onto the metal layer(s) on the outside of the substrate.

In some embodiments, the metal substrate is coated with a layer of carbonaceous material. Such a layer of carbonaceous material would be part of the coating layer. In some embodiments, the metal substrate is not coated with a layer of carbonaceous material.

When the composite is immersed into the delamination solution for an inadequate amount of time, the delamination agent and the aqueous solvent contained in the delamination solution might not possess sufficient time to destabilize, disrupt and break the bonds that are initially formed between the coating and the metal substrate surface to an extent that complete delamination of the composite is made possible. However, when the composite is immersed into the delamination solution for a prolonged period of time, corrosion of the metal substrate might occur due to extended contact time of the composite with the delamination agent (e.g. weak base) contained within the delamination solution. There is no particular limitation on the time taken for delamination, but the time taken should be sufficiently long as to allow for full delamination to occur, but sufficiently short as to ensure corrosion of the metal substrate does not occur.

In some embodiments, the composite is immersed into the delamination solution for a time period of from about 1 second to about 120 minutes, from about 5 seconds to about 120 minutes, from about 10 seconds to about 120 minutes, from about 20 seconds to about 120 minutes, from about 30 seconds to about 120 minutes, from about 45 seconds to about 120 minutes, from about 60 seconds to about 120 minutes, from about 75 seconds to about 120 minutes, from about 90 seconds to about 120 minutes, from about 105 seconds to about 120 minutes, from about 120 seconds to about 120 minutes, from 30 seconds to about 90 minutes, from 30 seconds to about 75 minutes, from 30 seconds to about 60 minutes, from 30 seconds to about 45 minutes, from 30 seconds to about 30 minutes, from 30 seconds to about 20 minutes, from 30 seconds to about 10 minutes, from 30 seconds to about 5 minutes, from 60 seconds to about 90 minutes, from 60 seconds to about 75 minutes, from 60 seconds to about 60 minutes, from 60 seconds to about 45 minutes, from 60 seconds to about 30 minutes, from 60 seconds to about 20 minutes, from 60 seconds to about 10 minutes, from 60 seconds to about 5 minutes, from about 120 seconds to about 60 minutes, from about 120 seconds to about 45 minutes, from about 120 seconds to about 30 minutes, from about 120 seconds to about 20 minutes, from about 120 seconds to about 10 minutes, or from about 120 seconds to about 5 minutes.

In some embodiments, the composite is immersed into the delamination solution for a time period of less than 120 minutes, less than 105 minutes, less than 90 minutes, less than 75 minutes, less than 60 minutes, less than 45 minutes, less than 30 minutes, less than 20 minutes, less than 10 minutes, less than 5 minutes, less than 1 minute, less than 45 seconds, less than 30 seconds, less than 20 seconds, or less than 10 seconds. In some embodiments, the composite is immersed into the delamination solution for a time period of more than 1 second, more than 5 seconds, more than 10 seconds, more than 20 seconds, more than 30 seconds, more than 45 seconds, more than 60 seconds, more than 75 seconds, more than 90 seconds, more than 105 seconds, more than 120 seconds, more than 5 minutes, more than 10 minutes, more than 20 minutes, or more than 30 minutes.

There is no particular limitation on the temperature of delamination, but the temperature should not be too low as to require an extremely long time to achieve full delamination, nor should the temperature be too high as to pose a health and safety risk.

In some embodiments, the composite is immersed into the delamination solution at a temperature of from about 10° C. to about 90° C., from about 15° C. to about 90° C., from about 20° C. to about 90° C., from about 25° C. to about 90° C., from about 30° C. to about 90° C., from about 35° C. to about 90° C., from about 40° C. to about 90° C., from about 45° C. to about 90° C., from about 50° C. to about 90° C., from about 55° C. to about 90° C., from about 60° C. to about 90° C., from about 65° C. to about 90° C., from about 70° C. to about 90° C., from about 75° C. to about 90° C., from about 20° C. to about 75° C., from about 25° C. to about 75° C., from about 30° C. to about 75° C., from about 35° C. to about 75° C., from about 40° C. to about 75° C., from about 45° C. to about 75° C., from about 50° C. to about 75° C., from about 55° C. to about 75° C., from about 60° C. to about 75° C., from about 25° C. to about 60° C., from about 30° C. to about 60° C., from about 35° C. to about 60° C., from about 40° C. to about 60° C., or from about 45° C. to about 60° C.

In some embodiments, the composite is immersed into the delamination solution at a temperature of less than 90° C., less than 85° C., less than 80° C., less than 75° C., less than 70° C., less than 65° C., less than 60° C., less than 55° C., less than 50° C., less than 45° C., less than 40° C., less than 35° C., or less than 30° C. In some embodiments, the composite is immersed into the delamination solution at a temperature of more than 10° C., more than 15° C., more than 20° C., more than 25° C., more than 30° C., more than 35° C., more than 40° C., more than 45° C., more than 50° C., more than 55° C., more than 60° C., more than 65° C., or more than 70° C.

When there is an insufficient amount of delamination solution used for immersion of a given amount of composite, full delamination of the composite cannot take place. An example of the consequence of such is a large proportion of the coating might still be found deposited or adhered on the surface of the metal substrate. There is no particular disadvantage to using too much delamination solution with respect to delamination performance, although this would represent a waste of raw materials, and in addition may produce unnecessary contaminated or polluted aqueous solvent waste that requires further treatment steps for solvent reuse. Accordingly, there is no particular limitation on the ratio of composite to delamination solution, except that the ratio of delamination solution to composite should be sufficient to enable the delamination of all the composite present, and furthermore it is not recommended that an overly large ratio of delamination agent to composite is used for cost reasons.

In some embodiments, as the composite is immersed into the delamination solution to achieve delamination of the composite, the weight ratio of the composite to the delamination solution is from about 0.01% to about 50%, from about 0.02% to about 50%, from about 0.05% to about 50%, from about 0.1% to about 50%, from about 0.2% to about 50%, from about 0.5% to about 50%, from about 1% to about 50%, from about 2% to about 50%, from about 5% to about 50%, from about 10% to about 50%, from about 15% to about 50%, from about 20% to about 50%, from about 25% to about 50%, from about 30% to about 50%, from about 0.01% to about 25%, from about 0.02% to about 25%, from about 0.05% to about 25%, from about 0.1% to about 25%, from about 0.2% to about 25%, from about 0.5% to about 25%, from about 1% to about 25%, from about 2% to about 25%, from about 5% to about 25%, from about 10% to about 25%, from about 0.1% to about 15%, from about 0.2% to about 15%, from about 0.5% to about 15%, from about 1% to about 15%, from about 2% to about 15%, from about 5% to about 15%, from about 0.1% to about 5%, from about 0.2% to about 5%, from about 0.5% to about 5%, from about 1% to about 5%, or from about 2% to about 5%.

In some embodiments, as the composite is immersed into the delamination solution to achieve delamination of the composite, the weight ratio of the composite to the delamination solution is less than 50%, less than 45%, less than 40%, less than 35%, less than 30%, less than 25%, less than 20%, less than 15%, less than 10%, less than 5%, less than 2%, less than 1%, less than 0.5%, less than 0.2%, less than 0.1%, or less than 0.05%. In some embodiments, as the composite is immersed into the delamination solution to achieve delamination of the composite, the weight ratio of the composite to the delamination solution is more than 0.01%, more than 0.02%, more than 0.05%, more than 0.1%, more than 0.2%, more than 0.5%, more than 1%, more than 2%, more than 5%, more than 10%, more than 15%, more than 20%, more than 25%, more than 30%, more than 35%, or more than 40%.

The purpose of the delamination agent is to interrupt and break the ion-dipole interactions and hydrogen bonding interactions between the copolymeric binder contained in the coating, and the metal substrate surface. A sufficient concentration of delamination agent in the delamination solution is required to efficiently disrupt interactions between the coating and the metal substrate and thus cause delamination of the composite. However, relatively low concentrations of the delamination agent are adequate to induce disruption of the interactions between the copolymeric binder within the coating, and the metal substrate surface. The use of delamination agent of low concentrations for immersion of the composite reduces the likelihood of corrosion of the metal substrate and other possible metal components of the composite and/or mitigates side reaction(s) that might arise from the use of high-concentration delamination agent.

In some embodiments, the concentration of the delamination agent in the delamination solution is from about 0.5 M to about 5 M, from about 0.75 M to about 5 M, from about 1 M to about 5 M, from about 1.25 M to about 5 M, from about 1.5 M to about 5 M, from about 1.75 M to about 5 M, from about 2 M to about 5 M, from about 2.25 M to about 5 M, from about 2.5 M to about 5 M, from about 0.5 M to about 3.5 M, from about 0.75 M to about 3.5 M, from about 1 M to about 3.5 M, from about 1.25 M to about 3.5 M, from about 1.5 M to about 3.5 M, from about 1.75 M to about 3.5 M, from about 2 M to about 3.5 M, from about 2.25 M to about 3.5 M, from about 2.5 M to about 3.5 M, from about 0.5 M to about 2.5 M, from about 0.75 M to about 2.5 M, from about 1 M to about 2.5 M, from about 1.25 M to about 2.5 M, from about 1.5 M to about 2.5 M, from about 0.5 M to about 2 M, from about 0.75 M to about 2 M, from about 1 M to about 2 M, from about 1.25 M to about 2 M, or from about 1.5 M to about 2 M.

In some embodiments, the concentration of the delamination agent in the delamination solution is less than 5 M, less than 4.75 M, less than 4.5 M, less than 4.25 M, less than 4 M, less than 3.75 M, less than 3.5 M, less than 3.25 M, less than 3 M, less than 2.75 M, less than 2.5 M, less than 2.25 M, less than 2 M, less than 1.75 M, or less than 1.5 M. In some embodiments, the concentration of the delamination agent in the delamination solution is more than 0.5 M, more than 0.75 M, more than 1 M, more than 1.25 M, more than 1.5 M, more than 1.75 M, more than 2 M, more than 2.25 M, more than 2.5 M, more than 2.75 M, more than 3 M, more than 3.25 M, more than 3.5 M, more than 3.75 M, or more than 4 M.

In some embodiments, the surface density of the coating is from about 1 mg/cm$^2$ to about 50 mg/cm$^2$, from about 2.5 mg/cm$^2$ to about 50 mg/cm$^2$, from about 5 mg/cm$^2$ to about 50 mg/cm$^2$, from about 7.5 mg/cm$^2$ to about 50 mg/cm$^2$, from about 10 mg/cm$^2$ to about 50 mg/cm$^2$, from about 12.5 mg/cm$^2$ to about 50 mg/cm$^2$, from about 15 mg/cm$^2$ to about 50 mg/cm$^2$, from about 17.5 mg/cm$^2$ to about 50 mg/cm$^2$, from about 20 mg/cm$^2$ to about 50 mg/cm$^2$, from about 25 mg/cm$^2$ to about 50 mg/cm$^2$, from about 30 mg/cm$^2$ to about 50 mg/cm$^2$, from about 1 mg/cm$^2$ to about 30 mg/cm$^2$, from about 2.5 mg/cm$^2$ to about 30 mg/cm$^2$, from about 5 mg/cm$^2$ to about 30 mg/cm$^2$, from about 7.5 mg/cm$^2$ to about 30 mg/cm$^2$, from about 10 mg/cm$^2$ to about 30 mg/cm$^2$, from about 12.5 mg/cm$^2$ to about 30 mg/cm$^2$, from about 15 mg/cm$^2$ to about 30 mg/cm$^2$, from about 17.5 mg/cm$^2$ to about 30 mg/cm$^2$, from about 20 mg/cm$^2$ to about 30 mg/cm$^2$, from about 1 mg/cm$^2$ to about 20 mg/cm$^2$, from about 2.5 mg/cm$^2$ to about 20 mg/cm$^2$, from about 5 mg/cm$^2$ to about 20 mg/cm$^2$, from about 7.5 mg/cm$^2$ to about 20 mg/cm$^2$, from about 10 mg/cm$^2$ to about 20 mg/cm$^2$, from about 12.5 mg/cm$^2$ to about 20 mg/cm$^2$, from about 1 mg/cm$^2$ to about 15 mg/cm$^2$, from about 2.5 mg/cm$^2$ to about 15 mg/cm$^2$, from about 5 mg/cm$^2$ to about 15 mg/cm$^2$, from about 7.5 mg/cm$^2$ to about 15 mg/cm$^2$, or from about 10 mg/cm$^2$ to about 15 mg/cm$^2$.

In some embodiments, the surface density of the coating is less than 50 mg/cm$^2$, less than 45 mg/cm$^2$, less than 35 mg/cm$^2$, less than 30 mg/cm$^2$, less than 25 mg/cm$^2$, less than 20 mg/cm$^2$, less than 17.5 mg/cm$^2$, less than 15 mg/cm$^2$, less than 12.5 mg/cm$^2$, less than 10 mg/cm$^2$, less than 7.5 mg/cm$^2$, less than 5 mg/cm$^2$, or less than 2.5 mg/cm$^2$. In some embodiments, the surface density of the coating is more than 1 mg/cm$^2$, more than 2.5 mg/cm$^2$, more than 5 mg/cm$^2$, more than 7.5 mg/cm$^2$, more than 10 mg/cm$^2$, more than 12.5 mg/cm$^2$, more than 15 mg/cm$^2$, more than 17.5 mg/cm$^2$, more than 20 mg/cm$^2$, more than 25 mg/cm$^2$, more than 30 mg/cm$^2$, more than 35 mg/cm$^2$, or more than 40 mg/cm$^2$.

In some embodiments, the density of the coating is from about 0.5 g/cm$^3$ to about 7.5 g/cm$^3$, from about 1 g/cm$^3$ to about 7.5 g/cm$^3$, from about 1.5 g/cm$^3$ to about 7.5 g/cm$^3$, from about 2 g/cm$^3$ to about 7.5 g/cm$^3$, from about 2.5 g/cm$^3$ to about 7.5 g/cm$^3$, from about 3 g/cm$^3$ to about 7.5 g/cm$^3$, from about 3.5 g/cm$^3$ to about 7.5 g/cm$^3$, from about 4 g/cm$^3$ to about 7.5 g/cm$^3$, from about 4.5 g/cm$^3$ to about 7.5 g/cm$^3$, from about 5 g/cm$^3$ to about 7.5 g/cm$^3$, from about 0.5 g/cm$^3$ to about 5 g/cm$^3$, from about 1 g/cm$^3$ to about 5 g/cm$^3$, from about 1.5 g/cm$^3$ to about 5 g/cm$^3$, from about 2 g/cm$^3$ to about 5 g/cm$^3$, from about 2.5 g/cm$^3$ to about 5 g/cm$^3$, from about 3 g/cm$^3$ to about 5 g/cm$^3$, from about 0.5 g/cm$^3$ to about 2.5 g/cm$^3$, from about 1 g/cm$^3$ to about 2.5 g/cm$^3$, or from about 1.5 g/cm$^3$ to about 2.5 g/cm$^3$.

In some embodiments, the density of the coating less than 7.5 g/cm$^3$, less than 7 g/cm$^3$, less than 6.5 g/cm$^3$, less than 6 g/cm$^3$, less than 5.5 g/cm$^3$, less than 5 g/cm$^3$, less than 4.5 g/cm$^3$, less than 4 g/cm$^3$, less than 3.5 g/cm$^3$, less than 3 g/cm$^3$, less than 2.5 g/cm$^3$, less than 2 g/cm$^3$, or less than 1.5 g/cm$^3$. In some embodiments, the density of the coating is more than 0.5 g/cm$^3$, more than 1 g/cm$^3$, more than 1.5 g/cm$^3$, more than 2 g/cm$^3$, more than 2.5 g/cm$^3$, more than 3 g/cm$^3$, more than 3.5 g/cm$^3$, more than 4 g/cm$^3$, more than 4.5 g/cm$^3$, more than 5 g/cm$^3$, more than 5.5 g/cm$^3$, more than 6 g/cm$^3$, or more than 6.5 g/cm$^3$.

In some embodiments, the composite-delamination solution mixture is stirred when the composite is immersed into the delamination solution to achieve delamination of the composite. In some embodiments, a planetary stirring mixer, a stirring mixer, a blender, an ultrasonicator, or combinations thereof is used to stir the composite-delamination solution mixture. In other embodiments, the composite-delamination solution mixture is not stirred while the composite is immersed in the delamination solution.

In some embodiments, the composite-delamination solution mixture is stirred at a speed of from about 10 rpm to about 3000 rpm, from about 20 rpm to about 3000 rpm, from about 50 rpm to about 3000 rpm, from about 100 rpm to about 3000 rpm, from about 200 rpm to about 3000 rpm, from about 250 rpm to about 3000 rpm, from about 300 rpm to about 3000 rpm, from about 400 rpm to about 3000 rpm, from about 500 rpm to about 3000 rpm, from about 600 rpm to about 3000 rpm, from about 750 rpm to about 3000 rpm, from about 900 rpm to about 3000 rpm, from about 1200 rpm to about 3000 rpm, from about 1500 rpm to about 3000 rpm, from about 10 rpm to about 1000 rpm, from about 20 rpm to about 1000 rpm, from about 50 rpm to about 1000 rpm, from about 100 rpm to about 1000 rpm, from about 200 rpm to about 1000 rpm, from about 250 rpm to about 1000 rpm, from about 300 rpm to about 1000 rpm, from about 400 rpm to about 1000 rpm, from about 500 rpm to about 1000 rpm, from about 10 rpm to about 750 rpm, from about 20 rpm to about 750 rpm, from about 50 rpm to about 750 rpm, from about 100 rpm to about 750 rpm, from about 200 rpm to about 750 rpm, from about 250 rpm to about 750 rpm, from about 300 rpm to about 750 rpm, from about 10 rpm to about 500 rpm, from about 20 rpm to about 500 rpm, from about 50 rpm to about 500 rpm, from about 100 rpm to about 500 rpm, or from about 200 rpm to about 500 rpm.

In some embodiments, the composite-delamination solution mixture is stirred at a speed of less than 3000 rpm, less than 2500 rpm, less than 1500 rpm, less than 1200 rpm, less than 900 rpm, less than 750 rpm, less than 600 rpm, less than 500 rpm, less than 400 rpm, less than 300 rpm, or less than 250 rpm. In some embodiments, the composite-delamination solution mixture is stirred at a speed of more than 10 rpm, more than 20 rpm, more than 50 rpm, more than 100 rpm, more than 200 rpm, more than 250 rpm, more than 300 rpm, more than 400 rpm, more than 500 rpm, more than 600 rpm, or more than 750 rpm.

In some embodiments, the composite-delamination solution mixture is stirred for a time period of from about 1 second to about 120 minutes, from about 5 seconds to about 120 minutes, from about 10 seconds to about 120 minutes, from about 20 seconds to about 120 minutes, from about 30 seconds to about 120 minutes, from about 45 seconds to about 120 minutes, from about 60 seconds to about 120 minutes, from about 75 seconds to about 120 minutes, from about 90 seconds to about 120 minutes, from about 105 seconds to about 120 minutes, from about 120 seconds to about 120 minutes, from 30 seconds to about 90 minutes, from 30 seconds to about 75 minutes, from 30 seconds to about 60 minutes, from 30 seconds to about 45 minutes, from 30 seconds to about 30 minutes, from 30 seconds to about 20 minutes, from 30 seconds to about 10 minutes, from 30 seconds to about 5 minutes, from 60 seconds to about 90 minutes, from 60 seconds to about 75 minutes, from 60 seconds to about 60 minutes, from 60 seconds to about 45 minutes, from 60 seconds to about 30 minutes, from 60 seconds to about 20 minutes, from 60 seconds to about 10 minutes, from 60 seconds to about 5 minutes, from about 120 seconds to about 60 minutes, from about 120 seconds to about 45 minutes, from about 120 seconds to about 30 minutes, from about 120 seconds to about 20 minutes, from about 120 seconds to about 10 minutes, or from about 120 seconds to about 5 minutes.

In some embodiments, the composite-delamination solution mixture is stirred for a time period of less than 120 minutes, less than 105 minutes, less than 90 minutes, less than 75 minutes, less than 60 minutes, less than 45 minutes, less than 30 minutes, less than 20 minutes, less than 10 minutes, less than 5 minutes, less than 1 minute, less than 45 seconds, less than 30 seconds, less than 20 seconds, or less than 10 seconds. In some embodiments, the composite-delamination solution mixture is stirred for a time period of more than 1 second, more than 5 seconds, more than 10 seconds, more than 20 seconds, more than 30 seconds, more than 45 seconds, more than 60 seconds, more than 75 seconds, more than 90 seconds, more than 105 seconds, more than 120 seconds, more than 5 minutes, more than 10 minutes, more than 20 minutes, or more than 30 minutes.

In some embodiments, the planetary stirring mixer comprises at least one planetary blade and at least one high-speed dispersion blade. In certain embodiments, the rotational speed of the planetary blade is from about 20 rpm to about 200 rpm, from about 20 rpm to about 150 rpm, from about 30 rpm to about 150 rpm, or from about 50 rpm to about 100 rpm. In certain embodiments, the rotational speed of the dispersion blade is from about 1,000 rpm to about 4,000 rpm, from about 1,000 rpm to about 3,500 rpm, from about 1,000 rpm to about 3,000 rpm, from about 1,000 rpm to about 2,000 rpm, from about 1,500 rpm to about 3,000 rpm, or from about 1,500 rpm to about 2,500 rpm.

In certain embodiments, the ultrasonicator is an ultrasonic bath, a probe-type ultrasonicator or an ultrasonic flow cell. In some embodiments, the ultrasonicator is operated at a power density from about 10 W/L to about 100 W/L, from about 20 W/L to about 100 W/L, from about 30 W/L to about 100 W/L, from about 40 W/L to about 80 W/L, from about 40 W/L to about 70 W/L, from about 40 W/L to about 60 W/L, from about 40 W/L to about 50 W/L, from about 50 W/L to about 60 W/L, from about 20 W/L to about 80 W/L, from about 20 W/L to about 60 W/L, or from about 20 W/L to about 40 W/L. In certain embodiments, the ultrasonicator is operated at a power density of more than 10 W/L, more than 20 W/L, more than 30 W/L, more than 40 W/L, more than 50 W/L, more than 60 W/L, more than 70 W/L, more than 80 W/L or more than 90 W/L.

In some embodiments, the ultrasonicator operates at a power from about 100 W to about 1000 W, from about 200 W to about 1000 W, from about 300 W to about 1000 W, from about 400 W to about 1000 W, from about 500 W to about 1000 W, from about 500 W to about 900 W, from about 500 W to about 800 W, from about 500 W to about 700 W, or from about 500 W to about 600 W. In some embodiments, the ultrasonicator operates at a power of less than 1000 W, less than 900 W, less than 800 W, less than 700 W, less than 600 W, less than 500 W, less than 400 W, or less than 300 W. In some embodiments, the ultrasonicator operates at a power of more than 100 W, more than 200 W, more than 300 W, more than 400 W, more than 500 W, more than 600 W, more than 700 W, or more than 800 W.

In some embodiments, after the immersion of the composite into the delamination solution, the pH of the composite-delamination solution mixture following delamination is from about 9 to about 13, from about 9.25 to about 13, from about 9.5 to about 13, from about 9.75 to about 13, from about 10 to about 13, from about 10.25 to about 13, from about 10.5 to about 13, from about 10.5 to about 12.75, from about 10.5 to about 12.5, from about 10.5 to about 12.25, from about 10.5 to about 12, from about 10.5 to about 11.75, or from about 10.5 to about 11.5.

In some embodiments, after the immersion of the composite into the delamination solution, the pH of the composite-delamination solution mixture following delamination is less than 13, less than 12.75, less than 12.5, less than 12.25, less than 12, less than 11.75, less than 11.5, less than 11.25, less than 11, less than 10.75, less than 10.5, less than 10.25, less than 10, less than 9.75, or less than 9.5. In some embodiments, after the immersion of the composite into the delamination solution, the pH of the composite-delamination solution mixture following delamination is more than 9, more than 9.25, more than 9.5, more than 9.75, more than 10, more than 10.25, more than 10.5, more than 10.75, more than 11, more than 11.25, more than 11.5, more than 11.75, more than 12, more than 12.25, or more than 12.5.

In some embodiments, after the immersion of the composite into the delamination solution, the composite is delaminated into two or more layers. In some embodiments, after the immersion of the composite into the delamination solution, the composite is delaminated into a coating layer and a metal substrate layer.

In some embodiments, the composite-delamination solution mixture following delamination is screened to separate the coating layer and the metal substrate layer from the delamination solution. In some embodiments, filtration, sieving, decantation, or combinations thereof may be used for screening of the composite-delamination solution mixture following delamination.

Figure 3:
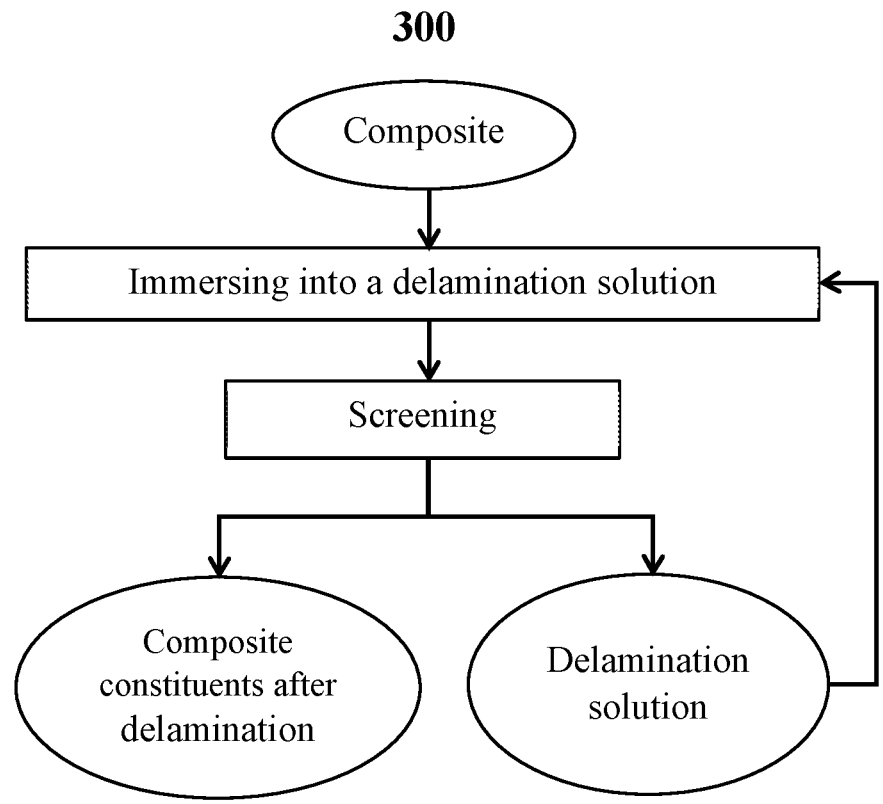
FIG. 3 is a flow chart of an embodiment illustrating the steps for delaminating a composite as disclosed herein and its subsequent further processing for extraction of the composite constituents, namely coating and metal substrate, following the delamination of the composite.

FIG. 3 is a flow chart of an embodiment illustrating the steps of method 300 for delaminating a composite as disclosed herein and its subsequent further processing for extraction of coating and metal substrate materials. Owing to the considerably low corrosion and dissolution tendencies of the metal substrate in the present invention, the extracted delamination solution is not necessarily required to be subjected to purification for further reuse. The extracted delamination solution may be reused for delamination of other composites. This allows the formation of a closed-loop recovery process where materials are repeatedly recycled and reused, and continually engage in a loop arrangement, which helps create a circular economy.

In some embodiments, the recovered delaminated composite materials may be subjected to additional separation and/or extraction process to further extract their respective materials contained within. In some embodiments, the recovered coating layer and metal substrate layer may be subjected to additional separation and/or extraction processes to further extract the coating and metal substrate materials.

The method of the present invention is particularly applicable in achieving delamination of an electrode in batteries, wherein the electrode is the composite, of which the electrode layer and the current collector are the coating and metal substrate respectively.

In some embodiments, the battery may be a primary battery or a secondary battery. Some non-limiting examples of the battery include alkaline battery, aluminum-air battery, lithium battery, lithium air battery, magnesium battery, solid-state battery, silver-oxide battery, zinc-air battery, aluminum-ion battery, lead-acid battery, lithium-ion battery, magnesium-ion battery, potassium-ion battery, sodium-ion battery, sodium-air battery, silicon-air battery, zinc-ion battery, and sodium-sulfur battery.

Within an electrode, a binder can be used for adhering the active material particles and the conductive agent together with the current collector to form a continuous electrical conduction path. Since the copolymeric binder disclosed herein has excellent adhesive capability, such a copolymeric binder can be used. With good adhesive capability among electrode layer components as well as between the electrode layer and the current collector, the usage of such a copolymeric binder can help reduce impedance and interfacial resistance between the current collector and electrode materials, and thereby improve ion and electron transport rates. Furthermore, the disclosed copolymer can interact readily with water through hydrogen bonding and ion-dipole interactions, which allows for the copolymeric binder to have excellent dispersibility and stability in water, allowing for good processibility in forming the electrode layer through the usage of a water-based slurry.

There are shortcomings with current methods in delaminating electrode layers form current collectors when recycling batteries, such as the requirement of high temperatures and the release of harmful materials when calcination is used, or dangerous and harmful chemicals when leaching is used.

Conversely, the delamination method disclosed herein allows an electrode comprising a current collector and an electrode layer coated on one side or both sides of the current collector, wherein the electrode layer comprises the copolymeric binder disclosed in the invention, to be effectively delaminated by the simple use of a delaminating solution without significant safety concerns or environmental impact. In addition, the delamination process is highly efficient.

Figure 4:
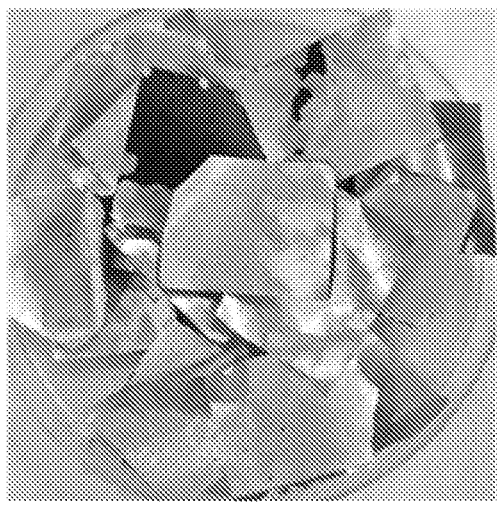
FIG. 4 depicts the recovered current collector of Example 3 after the immersion of the double side-coated cathode into the delamination solution, wherein the delamination solution comprises sodium carbonate at 2 M and de-ionized water (DI water), and wherein the double side-coated cathode comprises a copolymeric binder.

FIG. 4 depicts the recovered current collector of Example 3 after the immersion of the double side-coated cathode into a delamination solution, wherein the cathode comprises a copolymeric binder, and wherein the delamination solution comprises sodium carbonate of 2 M concentration and DI water. The cathode layers are shown to be delaminated from the aluminum current collector, and no discoloration or pitting of the aluminum current collector was observed, indicating that there was no significant corrosion of the aluminum current collector.

Figure 5:
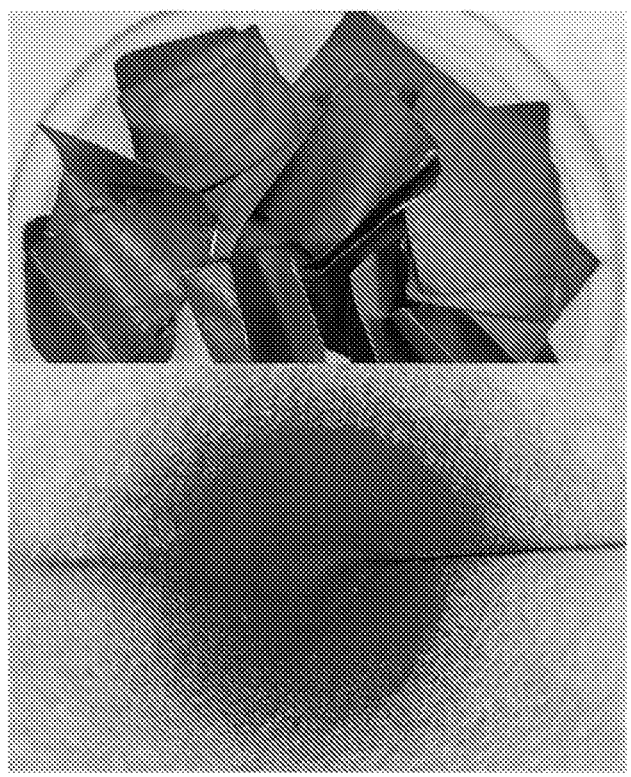
FIG. 5 depicts the recovered cathode of Comparative Example 1, wherein the delamination solution comprises sodium carbonate at 2 M and DI water, and wherein the double side-coated cathode comprises polyvinylidene fluoride (PVDF) as the polymeric binder.

FIG. 5 depicts the recovered cathode of Comparative Example 1 wherein the double side-coated cathode that is being immersed in the delamination solution comprises polyvinylidene fluoride (PVDF) as the polymeric binder. The delamination solution used herein comprises sodium carbonate at 2 M concentration and DI water. The delamination of the cathode layers from the aluminum current collector is shown to be unsuccessful where the cathode layers are still strongly adhered onto the aluminum current collector despite being immersed into the delamination solution. This indicates that the use of the delamination agent disclosed in the present invention to achieve electrode delamination is not applicable to electrode comprising non-aqueous polymeric binders such as PVDF.

The current collector acts to collect electrons generated by electrochemical reactions of the cathode active material or to supply electrons required for the electrochemical reactions. In some embodiments, the current collector can be in the form of a foil, sheet or film. In some embodiments, the current collector is a metal. In some embodiments, the current collector is selected from the group consisting of stainless steel, titanium, nickel, aluminum, copper, platinum, gold, silver, chromium, zirconium, tungsten, molybdenum, tin, vanadium, zinc, cadmium, iron, cobalt, lead, and alloys thereof. In some embodiments, the current collector only has one layer. In some embodiments, the current collector has a two-layered structure. In some embodiments, the current collector has three or more layers. In some embodiments, the material or materials in each layer may be the same, or may be different or partially different.

In some embodiments, when the current collector comprises more than one layer, the current collector comprises a layer of insulating material. In some embodiments, the insulating material is a polymeric material selected from the group consisting of polycarbonate, polyacrylate, polyacrylonitrile, polyester, polyamide, polystyrene, polyurethane, polyepoxy, poly(acrylonitrile butadiene styrene), polyimide, polyolefin, polyethylene, polypropylene, polyphenylene sulfide, poly(vinyl ester), polyvinyl chloride, polyether, polyphenylene oxide, cellulose polymer, and combinations thereof. When the current collector comprises a layer of insulating material, the coating is coated onto the metal layer(s) on the outside of the current collector.

In some embodiments, the current collector is coated with a layer of carbonaceous material. Such a layer of carbonaceous material would be part of the coating layer. In some embodiments, the current collector is not coated with a layer of carbonaceous material.

The thickness of the current collector affects the volume it occupies within the battery, the amount of the electrode active material needed, and hence the capacity in the battery. In some embodiments, the current collector has a thickness of from about 5 μm to about 50 μm, from about 10 μm to about 50 μm, from about 15 μm to about 50 μm, from about 20 μm to about 50 μm, from about 25 μm to about 50 μm, from about 5 μm to about 30 μm, from about 10 μm to about 30 μm, from about 15 μm to about 30 μm, from about 20 μm to about 30 μm, from about 5 μm to about 20 μm, from about 5 μm to about 15 μm, from about 10 μm to about 30 μm, from about 10 μm to about 25 μm, or from about 10 μm to about 20 μm.

In some embodiments, the current collector has a thickness of less than 50 μm, less than 45 μm, less than 40 μm, less than 35 μm, less than 30 μm, less than 25 μm, less than 20 μm, less than 15 μm, or less than 10 μm. In some embodiments, the current collector has a thickness of more than 5 μm, more than 10 μm, more than 15 μm, more than 20 μm, more than 25 μm, more than 30 μm, more than 35 μm, more than 40 μm, or more than 45 μm.

In some embodiments, the electrode may be a cathode or an anode. In some embodiments, the electrode layer further comprises an electrode active material.

In some embodiments, the electrode active material is a cathode active material, wherein the cathode active material is selected from the group consisting of $LiCoO_2$, $LiNiO_2$, $LiNi_xMn_yO_2$, $LiCo_xNi_yO_2$, $Li_{1+z}Ni_xMn_yCo_{1-x-y}O_2$, $LiNi_xCo_yAl_zO_2$, $LiV_2O_5$, $LiTiS_2$, $LiMoS_2$, $LiMnO_2$, $LiCrO_2$, $LiMn_2O_4$, $Li_2MnO_3$, $LiFeO_2$, $LiFePO_4$, and combinations thereof, wherein each x is independently from 0.1 to 0.9; each y is independently from 0 to 0.9; each z is independently from 0 to 0.4. In certain embodiments, each x in the above general formula is independently selected from 0.1, 0.125, 0.15, 0.175, 0.2, 0.225, 0.25, 0.275, 0.3, 0.325, 0.35, 0.375, 0.4, 0.425, 0.45, 0.475, 0.5, 0.525, 0.55, 0.575, 0.6, 0.625, 0.65, 0.675, 0.7, 0.725, 0.75, 0.775, 0.8, 0.825, 0.85, 0.875 and 0.9; each y in the above general formula is independently selected from 0, 0.025, 0.05, 0.075, 0.1, 0.125, 0.15, 0.175, 0.2, 0.225, 0.25, 0.275, 0.3, 0.325, 0.35, 0.375, 0.4, 0.425, 0.45, 0.475, 0.5, 0.525, 0.55, 0.575, 0.6, 0.625, 0.65, 0.675, 0.7, 0.725, 0.75, 0.775, 0.8, 0.825, 0.85, 0.875 and 0.9; each z in the above general formula is independently selected from 0, 0.025, 0.05, 0.075, 0.1, 0.125, 0.15, 0.175, 0.2, 0.225, 0.25, 0.275, 0.3, 0.325, 0.35, 0.375 and 0.4. In some embodiments, each x, y and z in the above general formula independently has a 0.01 interval.

In certain embodiments, the cathode active material is selected from the group consisting of $LiCoO_2$, $LiNiO_2$, $LiNi_xMn_yO_2$, $Li_{1+z}Ni_xMn_yCo_{1-x-y}O_2$ (NMC), $LiNi_xCo_yAl_zO_2$, $LiV_2O_5$, $LiTiS_2$, $LiMoS_2$, $LiMnO_2$, $LiCrO_2$, $LiMn_2O_4$, $LiFeO_2$, $LiFePO_4$, $LiCo_xNi_yO_2$, and combinations thereof, wherein each x is independently from 0.4 to 0.6; each y is independently from 0.2 to 0.4; and each z is independently from 0 to 0.1. In other embodiments, the cathode active material is not $LiCoO_2$, $LiNiO_2$, $LiV_2O_5$, $LiTiS_2$, $LiMoS_2$, $LiMnO_2$, $LiCrO_2$, $LiMn_2O_4$, $LiFeO_2$, or $LiFePO_4$. In further embodiments, the cathode active material is not $LiNi_xMn_yO_2$, $Li_{1+z}Ni_xMn_yCo_{1-x-y}O_2$, $LiNi_xCo_yAl_zO_2$ or $LiCo_xNi_yO_2$, wherein each x is independently from 0.1 to 0.9; each y is independently from 0 to 0.45; and each z is independently from 0 to 0.2. In certain embodiments, the cathode active material is $Li_{1+x}Ni_aMn_bCo_cAl_{(1-a-b-c)}$; wherein −0.2≤x≤0.2, 0≤a≤1, 0≤b≤1, 0≤c≤1, and a+b+c≤1. In some embodiments, the cathode active material has the general formula $Li_{1+x}Ni_aMn_bCo_cAl_{(1-a-b-c)}O_2$, with 0.33≤a<0.92, 0.33≤a≤0.92, 0.33≤a≤0.8, 0.4≤a<0.92, 0.4≤a≤0.9, 0.4≤a≤0.8, 0.5≤a≤0.92, 0.5≤a<0.9, 0.5≤a<0.8, 0.6≤a≤0.92, or 0.6≤a<0.9; 0≤b<0.5, 0≤b<0.4, 0≤b<0.3, 0≤b<0.2, 0.1≤b<0.5, 0.1≤b<0.4, 0.1≤b<0.3, 0.1≤b<0.2, 0.2≤b<0.5, 0.2≤b<0.4, or 0.2≤b<0.3; 0≤c<0.5, 0≤c<0.4, 0≤c<0.3, 0.1≤c<0.5, 0.1≤c<0.4, 0.1≤c<0.3, 0.1≤c<0.2, 0.2≤c<0.5, 0.2≤c<0.4, or 0.2≤c<0.3. In some embodiments, the cathode active material has the general formula $LiMPO_4$, wherein M is selected from the group consisting of Fe, Co, Ni, Mn, Al, Mg, Zn, Ti, La, Ce, Sn, Zr, Ru, Si, Ge, and combinations thereof. In some embodiments, the cathode active material is selected from the group consisting of $LiFePO_4$, $LiCoPO_4$, $LiNiPO_4$, $LiMnPO_4$, $LiMnFePO_4$, $LiMn_xFe_{(1-x)}PO_4$, and combinations thereof; wherein 0<x<1. In some embodiments, the cathode active material is $LiN_{1-x}Mn_yO_4$; wherein 0.1≤x≤0.9 and 0≤y≤2. In certain embodiments, the cathode active material is $xLi_2MnO_3·(1-x)LiMO_2$, wherein M is selected from the group consisting of Ni, Co, Mn, and combinations thereof; and wherein 0<x<1. In some embodiments, the cathode active material is $Li_3V_2(PO_4)_3$, or $LiVPO_4F$. In certain embodiments, the cathode active material has the general formula $Li_2MSiO_4$, wherein M is selected from the group consisting of Fe, Co, Mn, Ni, and combinations thereof.

In certain embodiments, the cathode active material is doped with a dopant selected from the group consisting of Co, Cr, V, Mo, Nb, Pd, F, Na, Fe, Ni, Mn, Al, Mg, Zn, Ti, La, Ce, Sn, Zr, Ru, Si, Ge, and combinations thereof. In some embodiments, the dopant is not Co, Cr, V, Mo, Nb, Pd, F, Na, Fe, Ni, Mn, Mg, Zn, Ti, La, Ce, Ru, Si, or Ge. In certain embodiments, the dopant is not Al, Sn, or Zr.

In some embodiments, the cathode active material is $LiNi_{0.33}Mn_{0.33}Co_{0.33}O_2$ (NMC333), $LiNi_{0.4}Mn_{0.4}Co_{0.2}O_2$, $LiNi_{0.5}Mn_{0.3}Co_{0.2}O_2$ (NMC532), $LiNi_{0.6}Mn_{0.2}Co_{0.2}O_2$ (NMC622), $LiNi_{0.7}Mn_{0.15}Co_{0.15}O_2$, $LiNi_{0.7}Mn_{0.1}Co_{0.2}O_2$, $LiNi_{0.8}Mn_{0.1}Co_{0.1}O_2$ (NMC811), $LiNi_{0.92}Mn_{0.04}Co_{0.04}O_2$, $LiNi_{0.8}Co_{0.15}Al_{0.05}O_2$ (NCA), $LiNiO_2$ (LNO), or combinations thereof.

In other embodiments, the cathode active material is not $LiCoO_2$, $LiNiO_2$, $LiMnO_2$, $LiMn_2O_4$, or $Li_2MnO_3$. In further embodiments, the cathode active material is not $LiNi_{0.33}Mn_{0.33}Co_{0.33}O_2$, $LiNi_{0.4}Mn_{0.4}Co_{0.2}O_2$, $LiNi_{0.5}Mn_{0.3}Co_{0.2}O_2$, $LiNi_{0.6}Mn_{0.2}Co_{0.2}O_2$, $LiNi_{0.7}Mn_{0.15}Co_{0.15}O_2$, $LiNi_{0.7}Mn_{0.1}Co_{0.2}O_2$, $LiNi_{0.8}Mn_{0.1}Co_{0.1}O_2$, $LiNi_{0.92}Mn_{0.04}Co_{0.04}O_2$, or $LiNi_{0.8}Co_{0.15}Al_{0.05}O_2$.

In certain embodiments, the cathode active material comprises or is a core-shell composite having a core and shell structure, wherein the core and the shell each independently comprise a lithium transition metal oxide selected from the group consisting of $Li_{1+x}Ni_aMn_bCo_cAl_{(1-a-b-c)}O_2$, $LiCoO_2$, $LiNiO_2$, $LiMnO_2$, $LiMn_2O_4$, $Li_2MnO_3$, $LiCrO_2$, $Li_4Ti_5O_{12}$, $LiV_2O_5$, $LiTiS_2$, $LiMoS_2$, $LiCo_aNi_bO_2$, $LiMn_aNi_bO_2$, and combinations thereof; wherein −0.2≤x≤0.2, 0≤a<1, 0≤b<1, 0≤c<1, and a+b+c≤1. In certain embodiments, each x in the above general formula is independently selected from −0.2, −0.175, −0.15, −0.125, −0.1, −0.075, −0.05, −0.025, 0, 0.025, 0.05, 0.075, 0.1, 0.125, 0.15, 0.175 and 0.2; each a in the above general formula is independently selected from 0, 0.025, 0.05, 0.075, 0.1, 0.125, 0.15, 0.175, 0.2, 0.225, 0.25, 0.275, 0.3, 0.325, 0.35, 0.375, 0.4, 0.425, 0.45, 0.475, 0.5, 0.525, 0.55, 0.575, 0.6, 0.625, 0.65, 0.675, 0.7, 0.725, 0.75, 0.775, 0.8, 0.825, 0.85, 0.875, 0.9, 0.925, 0.95 and 0.975; each b in the above general formula is independently selected from 0, 0.025, 0.05, 0.075, 0.1, 0.125, 0.15, 0.175, 0.2, 0.225, 0.25, 0.275, 0.3, 0.325, 0.35, 0.375, 0.4, 0.425, 0.45, 0.475, 0.5, 0.525, 0.55, 0.575, 0.6, 0.625, 0.65, 0.675, 0.7, 0.725, 0.75, 0.775, 0.8, 0.825, 0.85, 0.875, 0.9, 0.925, 0.95 and 0.975; each c in the above general formula is independently selected from 0, 0.025, 0.05, 0.075, 0.1, 0.125, 0.15, 0.175, 0.2, 0.225, 0.25, 0.275, 0.3, 0.325, 0.35, 0.375, 0.4, 0.425, 0.45, 0.475, 0.5, 0.525, 0.55, 0.575, 0.6, 0.625, 0.65, 0.675, 0.7, 0.725, 0.75, 0.775, 0.8, 0.825, 0.85, 0.875, 0.9, 0.925, 0.95 and 0.975. In some embodiment, each x, a, b and c in the above general formula independently has a 0.01 interval. In other embodiments, the core and the shell each independently comprise two or more lithium transition metal oxides. In some embodiments, one of the core or shell comprises only one lithium transition metal oxide, while the other comprises two or more lithium transition metal oxides. The lithium transition metal oxide or oxides in the core and the shell may be the same, or they may be different or partially different. In some embodiments, the two or more lithium transition metal oxides are uniformly distributed over the core. In certain embodiments, the two or more lithium transition metal oxides are not uniformly distributed over the core. In some embodiments, the cathode active material is not a core-shell composite.

In some embodiments, each of the lithium transition metal oxides in the core and the shell is independently doped with a dopant selected from the group consisting of Co, Cr, V, Mo, Nb, Pd, F, Na, Fe, Ni, Mn, Al, Mg, Zn, Ti, La, Ce, Sn, Zr, Ru, Si, Ge, and combinations thereof. In certain embodiments, the core and the shell each independently comprise two or more doped lithium transition metal oxides. In some embodiments, the two or more doped lithium transition metal oxides are uniformly distributed over the core and/or the shell. In certain embodiments, the two or more doped lithium transition metal oxides are not uniformly distributed over the core and/or the shell.

In some embodiments, the cathode active material comprises or is a core-shell composite comprising a core comprising a lithium transition metal oxide and a shell comprising a transition metal oxide. In certain embodiments, the lithium transition metal oxide is selected from the group consisting of $Li_{1+x}Ni_aMn_bCo_cAl_{(1-a-b-c)}O_2$, $LiCoO_2$, $LiNiO_2$, $LiMnO_2$, $LiMn_2O_4$, $Li_2MnO_3$, $LiCrO_2$, $Li_4Ti_5O_{12}$, $LiV_2O_5$, $LiTiS2$, $LiMoS2$, $LiCo_aNi_bO_2$, $LiMn_aNi_bO_2$, and combinations thereof; wherein $-0.2 \leq x \leq 0.2$, $0 \leq a < 1$, $0 \leq b < 1$, $0 \leq c < 1$, and $a_+b_+c < 1$. In certain embodiments, x in the above general formula is independently selected from −0.2, −0.175, −0.15, −0.125, −0.1, −0.075, −0.05, −0.025, 0, 0.025, 0.05, 0.075, 0.1, 0.125, 0.15, 0.175 and 0.2; each a in the above general formula is independently selected from 0, 0.025, 0.05, 0.075, 0.1, 0.125, 0.15, 0.175, 0.2, 0.225, 0.25, 0.275, 0.3, 0.325, 0.35, 0.375, 0.4, 0.425, 0.45, 0.475, 0.5, 0.525, 0.55, 0.575, 0.6, 0.625, 0.65, 0.675, 0.7, 0.725, 0.75, 0.775, 0.8, 0.825, 0.85, 0.875, 0.9, 0.925, 0.95 and 0.975; each b in the above general formula is independently selected from 0, 0.025, 0.05, 0.075, 0.1, 0.125, 0.15, 0.175, 0.2, 0.225, 0.25, 0.275, 0.3, 0.325, 0.35, 0.375, 0.4, 0.425, 0.45, 0.475, 0.5, 0.525, 0.55, 0.575, 0.6, 0.625, 0.65, 0.675, 0.7, 0.725, 0.75, 0.775, 0.8, 0.825, 0.85, 0.875, 0.9, 0.925, 0.95 and 0.975; each c in the above general formula is independently selected from 0, 0.025, 0.05, 0.075, 0.1, 0.125, 0.15, 0.175, 0.2, 0.225, 0.25, 0.275, 0.3, 0.325, 0.35, 0.375, 0.4, 0.425, 0.45, 0.475, 0.5, 0.525, 0.55, 0.575, 0.6, 0.625, 0.65, 0.675, 0.7, 0.725, 0.75, 0.775, 0.8, 0.825, 0.85, 0.875, 0.9, 0.925, 0.95 and 0.975. In some embodiment, each x, a, b and c in the above general formula independently has a 0.01 interval. In some embodiments, the transition metal oxide is selected from the group consisting of $Fe_2O_3$, $MnO_2$, $Al_2O_3$, $MgO$, $ZnO$, $TiO_2$, $La_2O_3$, $CeO_2$, $SnO_2$, $ZrO_2$, $RuO_2$, and combinations thereof. In certain embodiments, the shell comprises a lithium transition metal oxide and a transition metal oxide.

In some embodiments, the diameter of the core is from about 1 μm to about 15 μm, from about 3 μm to about 15 μm, from about 3 μm to about 10 μm, from about 5 μm to about 10 μm, from about 5 μm to about 45 μm, from about 5 μm to about 35 μm, from about 5 μm to about 25 μm, from about 10 μm to about 45 μm, from about 10 μm to about 40 μm, from about 10 μm to about 35 μm, from about 10 μm to about 25 μm, from about 15 μm to about 45 μm, from about 15 μm to about 30 μm, from about 15 μm to about 25 μm, from about 20 μm to about 35 μm, or from about 20 μm to about 30 ,nn. In certain embodiments, the thickness of the shell is from about 1 μm to about 45 μm, from about 1 μm to about 35 μm, from about 1 μm to about 25 μm, from about 1 μm to about 15 μm, from about 1 μm to about 10 μm, from about 1 μm to about 5 μm, from about 3 μm to about 15 ,nn, from about 3μm to about 10 μm, from about 5μm to about 10 ,nn, from about 10 μm to about 35 μm, from about 10 μm to about 20 iim, from about 15 iim to about 30 μm, from about 15 μm to about 25 μm, or from about 20 μm to about 35 μm. In certain embodiments, the diameter or thickness ratio of the core and the shell are in the range of 15:85 to 85:15, 25:75 to 75:25, 30:70 to 70:30, or 40:60 to 60:40. In certain embodiments, the volume or weight ratio of the core and the shell is 95:5, 90:10, 80:20, 70:30, 60:40, 50:50, 40:60, or 30:70.

In some embodiments, the electrode active material is an anode active material, wherein the anode active material is selected the group consisting of natural graphite particulate, synthetic graphite particulate, hard carbon, soft carbon, mesocarbon microbeads (MCMB), Sn particulate, $SnO_2$, SnO, $Li_4TiO_{12}$ particulate, Si particulate, Si—C composite particulate, and combinations thereof.

In certain embodiments, the anode active material is doped with a metallic element or a nonmetal element. In some embodiments, the metallic element is selected from the group consisting of Fe, Ni, Mn, Al, Mg, Zn, Ti, La, Ce, Sn, Zr, Ru, and combinations thereof. In some embodiments, the nonmetal element is B, Si, Ge, N, P, F, S, Cl, I, Se, or combinations thereof.

In some embodiments, the anode active material comprises or is a core-shell composite having a core and shell structure, wherein the core and the shell each is independently selected from the group consisting of natural graphite particulate, synthetic graphite particulate, hard carbon, soft carbon, mesocarbon microbeads (MCMB), Sn particulate, $SnO_2$, SnO, $Li_4Ti_5O_{12}$ particulate, Si particulate, Si—C composite particulate, and combinations thereof.

In certain embodiments, the core-shell composite comprises a core comprising a carbonaceous material and a shell coated on the carbonaceous material core. In some embodiments, the carbonaceous material is selected from the group consisting of soft carbon, hard carbon, natural graphite particulate, synthetic graphite particulate, mesocarbon microbeads, Kish graphite, pyrolytic carbon, mesophase pitches, mesophase pitch-based carbon fiber, and combinations thereof. In certain embodiments, the shell is selected from the group consisting of natural graphite particulate, synthetic graphite particulate, hard carbon, soft carbon, mesocarbon microbeads (MCMB), Sn particulate, $SnO_2$, SnO, $Li_4Ti_5O_{12}$ particulate, Si particulate, Si—C composite particulate, and combinations thereof.

In certain embodiments, the anode active material is not doped with a metallic element or a nonmetal element. In some embodiments, the anode active material is not doped with Fe, Ni, Mn, Al, Mg, Zn, Ti, La, Ce, Sn, Zr, Ru, B, Si, Ge, N, P, F, S, Cl, I, or Se.

In some embodiments, the electrode layer may additionally comprise other additives for enhancing electrode properties. In some embodiments, the additives may include conductive agents, surfactants, dispersants and flexibility enhancement additives.

In some embodiments, the electrode layer further comprises a conductive agent. The conductive agent is for enhancing the electrically-conducting property of an electrode. Any suitable material can act as the conductive agent. In some embodiments, the conductive agent is a carbonaceous material. Some non-limiting examples include carbon, carbon black, graphite, expanded graphite, graphene, graphene nanoplatelets, carbon fibers, carbon nano-fibers, graphitized carbon flake, carbon tubes, activated carbon, Super P, 0-dimensional KS6, 1-dimensional vapor grown carbon fibers (VGCF), mesoporous carbon, and combinations thereof.

In some embodiments, the electrode layer further comprises a lithium salt. The lithium salt can help increase ionic conductivity of the electrode layer and thereby reduce the resistance of the electrode. In some embodiments, the lithium salt is selected from the group consisting of lithium bis(trifluoromethanesulfonyl)imide (LiTFSI), lithium hexafluorophosphate (LiPF$_6$), lithium fluoroborate (LiBF$_4$), lithium metaborate (LiBO$_2$), lithium perchlorate (LiClO$_4$), lithium nitrate (LiNO$_3$), lithium bis(fluorosulfonyl)imide (LiFSI), lithium iodide (LiI), lithium tetrachloroaluminate (LiAlCl$_4$), lithium difluoro(oxalate)borate (LiBF$_2$C$_2$O$_4$), lithium bis(oxalato)borate (LiBOB), lithium acetate (LiAc), and combinations thereof.

In some embodiments, the electrode layer further comprises an ion-conductive polymer. The ion-conductive polymer can help increase ionic conductivity of the electrode layer and thereby reduce the resistance of the electrode. In some embodiments, the ion-conductive polymer is selected from the group consisting of polyethers, polycarbonates, polyacrylates, polysiloxanes, polyphosphazenes, polyethylene derivatives, alkylene oxide derivatives, phosphate polymers, poly-lysines, polyester sulfides, polyvinyl alcohol, polyvinylidene fluoride, polymers containing one or more ionically dissociable groups, copolymers thereof, and combinations thereof. In some embodiments, the ion-conductive polymer is selected from the group consisting of polyacrylonitriles (PANs), polyethylene carbonates (PECs), polyacrylamides (PAMs), polyethylene glycols (PEGs), polyethylene oxides (PEOs), polyhydroxyethylmethacrylates (P(HEMAs)), polyphosphonates (PPhs), polysiloxanes, polyamides (PAs), polydilactones, polydiesters, polyphasphazenes (PPHOSs), polyurethanes (PUs), copolymers thereof, and combinations thereof.

In some embodiments, the electrode layer further comprises an inorganic solid-state electrolyte. The inorganic solid-state electrolyte can help increase ionic conductivity of the electrode layer and thereby reduce the resistance of the electrode. In some embodiments, the inorganic solid-state electrolyte is selected from the group consisting of LPS sulfides containing sulfur and phosphorus, for example, Li$_2$S—P$_2$S$_5$; Li$_{4-x}$Ge$_{1-x}$P$_x$S$_4$ (LGPS, x is 0.1 to 2); Li$_{10±1}$MP$_2$X$_{12}$ (M=Ge, Si, Sn, Al, X=S, Se); Li$_{3.833}$Sn$_{0.833}$As$_{0.166}$S$_4$; Li$_4$SnS$_4$; B$_2$S$_3$—Li$_2$S; x Li$_2$S-(100-x) P$_2$S$_5$ (x is 70 to 80); Li$_2$S—SiS$_2$—Li$_3$N; Li$_2$S—P$_2$S$_5$—LiI; Li$_2$S—SiS$_2$—LiI; Li$_2$S—B2S$_3$—LiI; Li$_{10}$SnP$_2$S$_{12}$; Li$_6$PS$_5$X Argyrodite (where X is a halogen); thio-LISICON compounds such as Li$_{3.25}$Ge$_{0.25}$P$_{0.75}$S$_4$; anti-perovskites such as Li$_3$SX (X is Cl or Br); lithium-phosphorus-iodine-oxygen sulfides; lithium-phosphorus-oxygen sulfides; lithium-zinc-germanium sulfides; lithium-germanium-sulfides; LLTO-based compounds such as (La, Li) TiO$_3$; Li$_6$La$_2$CaTa$_6$O$_{12}$; Li$_6$La$_2$ANb$_2$O$_{12}$ (A is Ca and/or Sr) ; Li$_2$Nd$_3$TeSbO$_{12}$; Li$_3$BO$_{2.5}$N$_{0.5}$; Li$_9$SiAlO$_8$; LAGP compounds (Li$_{1+x}$Al$_x$Ge$_{2-x}$ (PO$_4$)$_3$, where 0≤x≤1, 0≤y≤1) ; Li$_2$O-LATP compounds such as Al$_2$O$_3$—TiO$_2$—P$_2$O$_5$; Li$_{1+x}$Al$_x$Ti$_{2-x}$(PO$_4$)$_3$ (where 0≤x≤1, 0≤y≤1) ; Li$_{1+x}$Ti$_{2-x}$Al$_x$Si$_y$(PO$_4$)$_{3-y}$ (where 0≤x≤1, 0≤y≤1); LiAl$_x$Zr$_{2-x}$(PO$_4$)$_3$ (where 0≤x≤1, 0≤y≤1); LiTi$_x$Zr$_{2-x}$(PO$_4$)$_3$ (where 0≤x≤1, 0≤y≤1); LISICON type solid-state electrolytes; UPON compounds (Li$_{3+y}$PO$_{4-x}$N$_x$, where 0≤x≤1, 0≤y≤1); Perovskite compounds ((La, Li) TiO$_3$); NASICON compounds such as LiTi$_2$(PO$_4$)$_3$; anti-perovskites such as Li$_3$OX (X is Cl or Br); lithium-aluminum-titanium-silicon phosphates (LATSP); lithium-aluminum oxides; lithium-vanadium-germanium oxides; lithium-zinc-germanium oxides; lithium-stuffed garnets such as lithium-lanthanum-zirconium oxides; lithium-lanthanum-zirconium-aluminum oxides; lithium-lanthanum-zirconium-tantalum oxides; Li$_3$N; lithium-aluminum chlorides; and combinations thereof.

The copolymeric binder applied in the present invention exhibits strong adhesion to the current collector. It is important for the copolymeric binder to have good adhesive strength to the current collector as it promotes the binding force of the electrode layer to the current collector in the making of battery electrode, prevents separation and enhances the mechanical stability of the electrode. In some embodiments, the adhesive strength between the copolymeric binder and the current collector is from about 2 N/cm to about 6 N/cm, from about 2 N/cm to about 5.8 N/cm, from about 2 N/cm to about 5.6 N/cm, from about 2 N/cm to about 5.4 N/cm, from about 2 N/cm to about 5.2 N/cm, from about 2 N/cm to about 5 N/cm, from about 2 N/cm to about 4.8 N/cm, from about 2 N/cm to about 4.6 N/cm, from about 2 N/cm to about 4.4 N/cm, from about 2 N/cm to about 4.2 N/cm, from about 2 N/cm to about 4 N/cm, from about 2 N/cm to about 3.9 N/cm, from about 2 N/cm to about 3.8 N/cm, from about 2 N/cm to about 3.7 N/cm, from about 2 N/cm to about 3.6 N/cm, from about 2 N/cm to about 3.5 N/cm, from about 2 N/cm to about 3.4 N/cm, from about 2 N/cm to about 3.3 N/cm, from about 2 N/cm to about 3.2 N/cm, from about 2 N/cm to about 3.1 N/cm, from about 2 N/cm to about 3 N/cm, from about 2.1 N/cm to about 6 N/cm, from about 2.2 N/cm to about 6 N/cm, from about 2.3 N/cm to about 6 N/cm, from about 2.4 N/cm to about 6 N/cm, from about 2.5 N/cm to about 6 N/cm, from about 2.6 N/cm to about 6 N/cm, from about 2.7 N/cm to about 6 N/cm, from about 2.8 N/cm to about 6 N/cm, from about 2.9 N/cm to about 6 N/cm, from about 3 N/cm to about 6 N/cm, from about 3.1 N/cm to about 6 N/cm, from about 3.2 N/cm to about 6 N/cm, from about 3.3 N/cm to about 6 N/cm, from about 3.4 N/cm to about 6 N/cm, from about 3.5 N/cm to about 6 N/cm, from about 3.6N/cm to about 6 N/cm, from about 3.7 N/cm to about 6 N/cm, from about 3.8 N/cm to about 6 N/cm, from about 3.9 N/cm to about 6 N/cm, from about 4 N/cm to about 6 N/cm, from about 2.5 N/cm to about 5.5 N/cm, from about 2.5 N/cm to about 5 N/cm, from about 2.5 N/cm to about 4.5 N/cm, from about 2.5 N/cm to about 4 N/cm, from about 2.5 N/cm to about 3.5 N/cm, from about 3 N/cm to about 5 N/cm, from about 2.2 N/cm to about 4.2 N/cm or from about 2.2 N/cm to about 5.2 N/cm.

In some embodiments, the adhesive strength between the copolymeric binder and the current collector is less than 6 N/cm, less than 5.8 N/cm, less than 5.6 N/cm, less than 5.4 N/cm, less than 5.2 N/cm, less than 5 N/cm, less than 4.8 N/cm, less than 4.6 N/cm, less than 4.4 N/cm, less than 4.2 N/cm, less than 4 N/cm, less than 3.9 N/cm, less than 3.8 N/cm, less than 3.7 N/cm, less than 3.6 N/cm, less than 3.5

N/cm, less than 3.4 N/cm, less than 3.3 N/cm, less than 3.2 N/cm, less than 3.1 N/cm, less than 3 N/cm, less than 2.9 N/cm, less than 2.8 N/cm, less than 2.7 N/cm, less than 2.6 N/cm, less than 2.5 N/cm, less than 2.4 N/cm, less than 2.3 N/cm or less than 2.2 N/cm. In some embodiments, the adhesive strength between the copolymeric binder and the current collector is more than 2 N/cm, more than 2.1 N/cm, more than 2.2 N/cm, more than 2.3 N/cm, more than 2.4 N/cm, more than 2.5 N/cm, more than 2.6 N/cm, more than 2.7 N/cm, more than 2.8 N/cm, more than 2.9 N/cm, more than 3 N/cm, more than 3.1 N/cm, more than 3.2 N/cm, more than 3.3 N/cm, more than 3.4 N/cm, more than 3.5 N/cm, more than 3.6 N/cm, more than 3.7 N/cm, more than 3.8 N/cm, more than 3.9 N/cm, more than 4 N/cm, more than 4.2 N/cm, more than 4.4 N/cm, more than 4.6 N/cm, more than 4.8 N/cm, more than 5 N/cm, more than 5.2 N/cm, more than 5.4 N/cm, more than 5.6 N/cm or more than 5.8 N/cm.

In addition, the copolymeric binder applied in the present invention allows the exhibition of strong adhesion of the electrode layer to the current collector in an electrode. It is important for the electrode layer to have good peeling strength to the current collector as this would greatly influence the mechanical stability of the electrodes and the cyclability of the battery. Therefore, the electrodes should have sufficient peeling strength to withstand the rigors of battery manufacture.

In some embodiments, the peeling strength between the current collector and the electrode layer is in the range from about 1.0 N/cm to about 8.0 N/cm, from about 1.0 N/cm to about 6.0 N/cm, from about 1.0 N/cm to about 5.0 N/cm, from about 1.0 N/cm to about 4.0 N/cm, from about 1.0 N/cm to about 3.0 N/cm, from about 1.0 N/cm to about 2.5 N/cm, from about 1.0 N/cm to about 2.0 N/cm, from about 1.2 N/cm to about 3.0 N/cm, from about 1.2 N/cm to about 2.5 N/cm, from about 1.2 N/cm to about 2.0 N/cm, from about 1.5 N/cm to about 3.0 N/cm, from about 1.5 N/cm to about 2.5 N/cm, from about 1.5 N/cm to about 2.0 N/cm from about 1.8 N/cm to about 3.0 N/cm, from about 1.8 N/cm to about 2.5 N/cm, from about 2.0 N/cm to about 6.0 N/cm, from about 2.0 N/cm to about 5.0 N/cm, from about 2.0 N/cm to about 3.0 N/cm, from about 2.0 N/cm to about 2.5 N/cm, from about 2.2 N/cm to about 3.0 N/cm, from about 2.5 N/cm to about 3.0 N/cm, from about 3.0 N/cm to about 8.0 N/cm, from about 3.0 N/cm to about 6.0 N/cm, or from about 4.0 N/cm to about 6.0 N/cm.

In some embodiments, the peeling strength between the current collector and the electrode layer is 1.0 N/cm or more, 1.2 N/cm or more, 1.5 N/cm or more, 2.0 N/cm or more, 2.2 N/cm or more, 2.5 N/cm or more, 3.0 N/cm or more, 3.5 N/cm or more, 4.5 N/cm or more, 5.0 N/cm or more, 5.5 N/cm or more, 6.0 N/cm or more, 6.5 N/cm or more, 7.0 N/cm or more or 7.5 N/cm or more. In some embodiments, the peeling strength between the current collector and the electrode layer is less than 8.0 N/cm, less than 7.5 N/cm, less than 7.0 N/cm, less than 6.5 N/cm, less than 6.0 N/cm, less than 5.5 N/cm, less than 5.0 N/cm, less than 4.5 N/cm, less than 4.0 N/cm, less than 3.5 N/cm, less than 3.0 N/cm, less than 2.8 N/cm, less than 2.5 N/cm, less than 2.2 N/cm, less than 2.0 N/cm, less than 1.8 N/cm, or less than 1.5 N/cm.

In some embodiments, the surface density of each of the cathode and anode electrode layer is independently from about 1 mg/cm$^2$ to about 50 mg/cm$^2$, from about 2.5 mg/cm$^2$ to about 50 mg/cm$^2$, from about 5 mg/cm$^2$ to about 50 mg/cm$^2$, from about 7.5 mg/cm$^2$ to about 50 mg/cm$^2$, from about 10 mg/cm$^2$ to about 50 mg/cm$^2$, from about 12.5 mg/cm$^2$ to about 50 mg/cm$^2$, from about 15 mg/cm$^2$ to about 50 mg/cm$^2$, from about 17.5 mg/cm$^2$ to about 50 mg/cm$^2$, from about 20 mg/cm$^2$ to about 50 mg/cm$^2$, from about 25 mg/cm$^2$ to about 50 mg/cm$^2$, from about 30 mg/cm$^2$ to about 50 mg/cm$^2$, from about 1 mg/cm$^2$ to about 30 mg/cm$^2$, from about 2.5 mg/cm$^2$ to about 30 mg/cm$^2$, from about 5 mg/cm$^2$ to about 30 mg/cm$^2$, from about 7.5 mg/cm$^2$ to about 30 mg/cm$^2$, from about 10 mg/cm$^2$ to about 30 mg/cm$^2$, from about 12.5 mg/cm$^2$ to about 30 mg/cm$^2$, from about 15 mg/cm$^2$ to about 30 mg/cm$^2$, from about 17.5 mg/cm$^2$ to about 30 mg/cm$^2$, from about 20 mg/cm$^2$ to about 30 mg/cm$^2$, from about 1 mg/cm$^2$ to about 20 mg/cm$^2$, from about 2.5 mg/cm$^2$ to about 20 mg/cm$^2$, from about 5 mg/cm$^2$ to about 20 mg/cm$^2$, from about 7.5 mg/cm$^2$ to about 20 mg/cm$^2$, from about 10 mg/cm$^2$ to about 20 mg/cm$^2$, from about 12.5 mg/cm$^2$ to about 20 mg/cm$^2$, from about 1 mg/cm$^2$ to about 15 mg/cm$^2$, from about 2.5 mg/cm$^2$ to about 15 mg/cm$^2$, from about 5 mg/cm$^2$ to about 15 mg/cm$^2$, from about 7.5 mg/cm$^2$ to about 15 mg/cm$^2$, or from about 10 mg/cm$^2$ to about 15 mg/cm$^2$.

In some embodiments, the surface density of each of the cathode and anode electrode layer is independently less than 50 mg/cm$^2$, less than 45 mg/cm$^2$, less than 35 mg/cm$^2$, less than 30 mg/cm$^2$, less than 25 mg/cm$^2$, less than 20 mg/cm$^2$, less than 17.5 mg/cm$^2$, less than 15 mg/cm$^2$, less than 12.5 mg/cm$^2$, less than 10 mg/cm$^2$, less than 7.5 mg/cm$^2$, less than 5 mg/cm$^2$, or less than 2.5 mg/cm$^2$. In some embodiments, the surface density of each of the cathode and anode electrode layer is independently more than 1 mg/cm$^2$, more than 2.5 mg/cm$^2$, more than 5 mg/cm$^2$, more than 7.5 mg/cm$^2$, more than 10 mg/cm$^2$, more than 12.5 mg/cm$^2$, more than 15 mg/cm$^2$, more than 17.5 mg/cm$^2$, more than 20 mg/cm$^2$, more than 25 mg/cm$^2$, more than 30 mg/cm$^2$, more than 35 mg/cm$^2$, or more than 40 mg/cm$^2$.

In some embodiments, the density of each of the cathode and anode electrode layer is independently from about 0.5 g/cm$^3$ to about 7.5 g/cm$^3$, from about 1 g/cm$^3$ to about 7.5 g/cm$^3$, from about 1.5 g/cm$^3$ to about 7.5 g/cm$^3$, from about 2 g/cm$^3$ to about 7.5 g/cm$^3$, from about 2.5 g/cm$^3$ to about 7.5 g/cm$^3$, from about 3 g/cm$^3$ to about 7.5 g/cm$^3$, from about 3.5 g/cm$^3$ to about 7.5 g/cm$^3$, from about 4 g/cm$^3$ to about 7.5 g/cm$^3$, from about 4.5 g/cm$^3$ to about 7.5 g/cm$^3$, from about 5 g/cm$^3$ to about 7.5 g/cm$^3$, from about 0.5 g/cm$^3$ to about 5 g/cm$^3$, from about 1 g/cm$^3$ to about 5 g/cm$^3$, from about 1.5 g/cm$^3$ to about 5 g/cm$^3$, from about 2 g/cm$^3$ to about 5 g/cm$^3$, from about 2.5 g/cm$^3$ to about 5 g/cm$^3$, from about 3 g/cm$^3$ to about 5 g/cm$^3$, from about 0.5 g/cm$^3$ to about 2.5 g/cm$^3$, from about 1 g/cm$^3$ to about 2.5 g/cm$^3$, or from about 1.5 g/cm$^3$ to about 2.5 g/cm$^3$.

In some embodiments, the density of each of the cathode and anode electrode layer is independently less than 7.5 g/cm$^3$, less than 7 g/cm$^3$, less than 6.5 g/cm$^3$, less than 6 g/cm$^3$, less than 5.5 g/cm$^3$, less than 5 g/cm$^3$, less than 4.5 g/cm$^3$, less than 4 g/cm$^3$, less than 3.5 g/cm$^3$, less than 3 g/cm$^3$, less than 2.5 g/cm$^3$, less than 2 g/cm$^3$, or less than 1.5 g/cm$^3$. In some embodiments, the density of each of the cathode and anode electrode layer is independently more than 0.5 g/cm$^3$, more than 1 g/cm$^3$, more than 1.5 g/cm$^3$, more than 2 g/cm$^3$, more than 2.5 g/cm$^3$, more than 3 g/cm$^3$, more than 3.5 g/cm$^3$, more than 4 g/cm$^3$, more than 4.5 g/cm$^3$, more than 5 g/cm$^3$, more than 5.5 g/cm$^3$, more than 6 g/cm$^3$, or more than 6.5 g/cm$^3$.

In some embodiments, a battery comprising an electrode that is to be delaminated is first disassembled into one or more battery pieces, wherein said one or more battery pieces comprise one or more electrode pieces. There is no particular limitation on the method used to disassemble the battery, except that the minimum size of the resultant battery pieces should be larger than the hole size of the screen used for screening of the composite-delamination solution mixture following delamination in order to ensure that the pieces would be able to be screened. In some embodiments, a crusher, mill, or cutter is used to disassemble the battery. In some embodiments, a water jet is used to disassemble the battery. In some embodiments, low temperature treatment of the battery, for example using liquid nitrogen, is conducted before disassembly. In some embodiments, the battery is first discharged. In some embodiments, the battery is discharged by immersion in a salt solution. In other embodiments, when a water jet is used for disassembling the battery, and/or when low temperature treatment of the battery is conducted before battery disassembly, discharging of the battery is not required.

In some embodiments, when the battery pieces are immersed into the delamination solution to achieve delamination of the electrodes, the weight ratio of the battery pieces to the delamination solution is from about 0.01% to about 50%, from about 0.02% to about 50%, from about 0.05% to about 50%, from about 0.1% to about 50%, from about 0.2% to about 50%, from about 0.5% to about 50%, from about 1% to about 50%, from about 2% to about 50%, from about 5% to about 50%, from about 10% to about 50%, from about 15% to about 50%, from about 20% to about 50%, from about 25% to about 50%, from about 30% to about 50%, from about 0.01% to about 25%, from about 0.02% to about 25%, from about 0.05% to about 25%, from about 0.1% to about 25%, from about 0.2% to about 25%, from about 0.5% to about 25%, from about 1% to about 25%, from about 2% to about 25%, from about 5% to about 25%, from about 10% to about 25%, from about 0.1% to about 15%, from about 0.2% to about 15%, from about 0.5% to about 15%, from about 1% to about 15%, from about 2% to about 15%, from about 5% to about 15%, from about 0.1% to about 5%, from about 0.2% to about 5%, from about 0.5% to about 5%, from about 1% to about 5%, or from about 2% to about 5%.

In some embodiments, when the battery pieces are immersed into the delamination solution to achieve delamination of the electrodes, the weight ratio of the battery pieces to the delamination solution is less than 50%, less than 45%, less than 40%, less than 35%, less than 30%, less than 25%, less than 20%, less than 15%, less than 10%, less than 5%, less than 2%, less than 1%, less than 0.5%, less than 0.2%, less than 0.1%, or less than 0.05%. In some embodiments, when the battery pieces are immersed into the delamination solution to achieve delamination of the electrodes, the weight ratio of the battery pieces to the delamination solution is more than 0.01%, more than 0.02%, more than 0.05%, more than 0.1%, more than 0.2%, more than 0.5%, more than 1%, more than 2%, more than 5%, more than 10%, more than 15%, more than 20%, more than 25%, more than 30%, more than 35%, or more than 40%.

In other embodiments, the electrode piece(s) is separated from the remainder of the battery piece(s) following disassembly but prior to delamination. In some embodiments, following separation of the electrode piece(s) from the remainder of the battery piece(s), only the electrode piece(s) are subjected to delamination.

In some embodiments, when only the electrode pieces are immersed into the delamination solution to achieve delamination of the electrodes, the weight ratio of the electrode pieces to the delamination solution is from about 0.01% to about 50%, from about 0.02% to about 50%, from about 0.05% to about 50%, from about 0.1% to about 50%, from about 0.2% to about 50%, from about 0.5% to about 50%, from about 1% to about 50%, from about 2% to about 50%, from about 5% to about 50%, from about 10% to about 50%, from about 15% to about 50%, from about 20% to about 50%, from about 25% to about 50%, from about 30% to about 50%, from about 0.01% to about 25%, from about 0.02% to about 25%, from about 0.05% to about 25%, from about 0.1% to about 25%, from about 0.2% to about 25%, from about 0.5% to about 25%, from about 1% to about 25%, from about 2% to about 25%, from about 5% to about 25%, from about 10% to about 25%, from about 0.1% to about 15%, from about 0.2% to about 15%, from about 0.5% to about 15%, from about 1% to about 15%, from about 2% to about 15%, from about 5% to about 15%, from about 0.1% to about 5%, from about 0.2% to about 5%, from about 0.5% to about 5%, from about 1% to about 5%, or from about 2% to about 5%.

In some embodiments, when only the electrode pieces are immersed into the delamination solution to achieve delamination of the electrodes, the weight ratio of the electrode pieces to the delamination solution is less than 50%, less than 45%, less than 40%, less than 35%, less than 30%, less than 25%, less than 20%, less than 15%, less than 10%, less than 5%, less than 2%, less than 1%, less than 0.5%, less than 0.2%, less than 0.1%, or less than 0.05%. In some embodiments, when only the electrode pieces are immersed into the delamination solution to achieve delamination of the electrodes, the weight ratio of the electrode pieces to the delamination solution is more than 0.01%, more than 0.02%, more than 0.05%, more than 0.1%, more than 0.2%, more than 0.5%, more than 1%, more than 2%, more than 5%, more than 10%, more than 15%, more than 20%, more than 25%, more than 30%, more than 35%, or more than 40%.

The utilization of the method of the present invention in delaminating an electrode comprising a copolymeric binder results in a delamination success rate of greater than 80%, an exceptionally high recovery rate (>97%), and a short time required to delaminate the electrode layer from the current collector (<8 minutes).

In some embodiments, delamination of the electrode occurs along the electrode layer-current collector interface. The delamination success rate refers to the extent of delamination of electrode layer from the current collector. Success rate can be calculated by the $$\text{formula success rate (\%)} = \frac{\text{mass of electrode layer successfully delaminated}}{\text{mass of electrode layer successfully delaminated} + \text{mass of electrode layer remaining on current collector}} \times 100\%$$

Following the delamination reaction, the mass of the electrode layer present in the delamination solution would correspond to the mass of electrode layer successfully delaminated. The mass of the electrode layer still coated on the current collector is then the mass of electrode layer remaining on the current collector, and can be measured by scraping this remaining electrode layer off manually, then weighing the mass of the scraped contents. In the case of the present invention where an electrode layer is completely delaminated from the current collector, the delamination success rate is 100%. In other cases where an electrode layer is not delaminated from the current collector or an electrode layer is partially delaminated from the current collector with visible deposits of the electrode layer remaining on the current collector, the success rate would then be less than 100%.

The recovery rate refers to the proportion of the sum of the weight of the recovered electrode layer and current collector successfully retrieved, based on the initial weight of electrode before immersion into the delamination solution. The recovery rate is only calculated when the success rate is greater than 75%, since below this quantity, it is assumed that the delamination is ineffective, and would not be economically feasible so as to be worth considering in an industrial context. It serves as a reflection of the extent of corrosion of invaluable metal materials in the electrode and/or dissolution of the invaluable metal materials into the delamination solution. The method disclosed herein yields a high recovery rate, indicating that extent of corrosion or dissolution of metallic electrode materials, such as current collector, into the delamination solution is negligible.

The present invention provides a simple method that can be used to delaminate the electrode layer from the current collector, taking into account the composition of the copolymeric binder used. As separation of electrode layers and current collectors constitutes a vital step in the recycling of batteries, the method disclosed herein offers a technical solution in fulfilling the demand in battery recycling. The method of the present invention circumvents both complex separation processes and contamination of current collector, and enables an excellent materials recovery (i.e. high recovery rate).

The method disclosed in the present invention considerably reduces the time required to delaminate the electrode layer from the current collector in a battery without damaging the underlying current collector. With a shorter contact time between the electrode and the delamination solution, corrosion of current collector and electrode active material, as well as other electrode materials made of metals, could be circumvented. For example, the shorter contact time allows the natural oxide layer formed on the surface of the aluminum current collector to achieve sufficient protection against corrosion when an electrode comprising an aluminum current collector is immersed into a weak base-containing delamination solution.

The method of the present invention is also applicable to achieve delamination of a packaging material by immersing the packaging material into a delamination solution; wherein the packaging material comprises a metal and a coating layer coated on one side or both sides of the metal, wherein the coating comprises a copolymeric binder.

The coating layer can comprise metal, plastic, paper or possibly cardboard. The metal and the coating layer are separated from each other by treating the packaging material with a weak base-containing delamination solution. The method disclosed herein could be utilized in delaminating a wide range of packaging materials, particularly in food packaging and beverage packaging, to bring about the recovery and recycling of individual material components used in packaging.

The following examples are presented to exemplify embodiments of the invention but are not intended to limit the invention to the specific embodiments set forth. Unless indicated to the contrary, all parts and percentages are by weight. All numerical values are approximate. When numerical ranges are given, it should be understood that embodiments outside the stated ranges may still fall within the scope of the invention. Specific details described in each example should not be construed as necessary features of the invention.

EXAMPLES

The pH values of the electrode-delamination solution mixture following delamination were measured by an electrode-type pH meter (ION 2700, Eutech Instruments).

The recovery rate refers to the proportion of the sum of the weight of the recovered electrode layer and current collector, based on the initial weight of electrode before immersion into the delamination solution.

The delamination success rate refers to the extent of delamination of electrode layer from the current collector. It can be calculated by the formula $$\text{success rate } (\%) = \frac{\text{mass of electrode layer successfully delaminated}}{\text{mass of electrode layer successfully delaminated} + \text{mass of electrode layer remaining on current collector}} \times 100\%$$

Accordingly, following the completion or abortion of the delamination reaction, electrode layer present in the delamination solution was recovered to obtain the mass of electrode layer successfully delaminated, while the remaining electrode layer material (if any) on the electrode was scraped off manually to obtain the mass of electrode layer remaining on current collector.

The adhesive strengths of the dried binder layers were measured by a tensile testing machine (DZ-106A, obtained from Dongguan Zonhow Test Equipment Co. Ltd., China). This test measures the average force required to peel a binder layer from the current collector at 180° angle in Newtons. The mean roughness depth ($R_z$) of the current collector is 2 μm. The copolymeric binder was coated on the current collector and dried to obtain a binder layer of thickness 10 μm to 12 μm. The coated current collector was then placed in an environment of constant temperature of 25° C. and humidity of 50% to 60% for 30 minutes. A strip of adhesion tape (3M; US; model no. 810) with a width of 18 mm and a length of 20 mm was attached onto the surface of the binder layer. The binder strip was clipped onto the testing machine and the tape was folded back on itself at 180 degrees, and placed in a moveable jaw and pulled at room temperature and a peel rate of 300 mm per minute. The maximum stripping force measured was taken as the adhesive strength. Measurements were repeated three times to find the average value.

The peeling strengths of the dried electrode layers were measured by a tensile testing machine (DZ-106A, obtained from Dongguan Zonhow Test Equipment Co. Ltd., China). This test measures the average force required to peel an electrode layer from the current collector at 180° angle in Newtons. The mean roughness depth ($R_z$) of the current collector is 2 μm. A strip of adhesion tape (3M; US; model no. 810) with a width of 18 mm and a length of 20 mm was attached onto the surface of the cathode electrode layer. The cathode strip was clipped onto the testing machine and the tape was folded back on itself at 180 degrees, and placed in a moveable jaw and pulled at room temperature and a peel rate of 200 mm per minute. The maximum stripping force measured was taken as the peeling strength. Measurements were repeated three times to find the average value.

Example 1

Assembling of Pouch-Type Full Lithium-Ion Batteries

A) Preparation of Polymeric Binder 18.15 g of sodium hydroxide (NaOH) was added into a round-bottom flask containing 380 g of distilled water. The mixture was stirred at 80 rpm for 30 mins to obtain a first suspension.

36.04 g of acrylic acid was added into the first suspension. The mixture was further stirred at 80 rpm for 30 mins to obtain a second suspension.

19.04 g of acrylamide was dissolved in 10 g of DI water to form an acrylamide solution. Thereafter, 29.04 g of acrylamide solution was added into the second suspension. The mixture was further heated to 55° C. and stirred at 80 rpm for 45 mins to obtain a third suspension.

12.92 g of acrylonitrile was added into the third suspension. The mixture was further stirred at 80 rpm for 10 mins to obtain a fourth suspension.

Further, 0.015 g of water-soluble free radical initiator (ammonium persulfate, APS; obtained from Aladdin Industries Corporation, China) was dissolved in 3 g of DI water and 0.0075 g of reducing agent (sodium bisulfite; obtained from Tianjin Damao Chemical Reagent Factory, China) was dissolved in 1.5 g of DI water. 3.015 g of APS solution and 1.5075 g of sodium bisulfite solution were added into the fourth suspension. The mixture was stirred at 200 rpm for 24 h at 55° C. to obtain a fifth suspension.

After the complete reaction, the temperature of the fifth suspension was lowered to 25° C. 3.72 g of NaOH was dissolved in 400 g of DI water. Thereafter, 403.72 g of sodium hydroxide solution was added dropwise into the fifth suspension to adjust pH to 7.3 to form the sixth suspension. The sixth suspension was filtered using 200 µm nylon mesh to form the binder material. The solid content of the binder material was 9.00 wt. %. The adhesive strength between the copolymeric binder and the current collector was 3.27 N/cm. The components of the copolymeric binder of Example 1 and their respective proportions are shown in Table 1 below.

B) Preparation of Positive Electrode

A first mixture was prepared by dispersing 12 g of conductive agent (SuperP; obtained from Timcal Ltd, Bodio, Switzerland) and 100 g of binder material (9.00 wt. % solid content) in 74 g of deionized water while stirring with an overhead stirrer (R20, IKA). After the addition, the first mixture was further stirred for about 30 minutes at 25° C. at a speed of 1,200 rpm.

Thereafter, a second mixture was prepared by adding 276 g of NMC532 (obtained from Shandong Tianjiao New Energy Co., Ltd, China) in the first mixture at 25° C. while stirring with an overhead stirrer. Then, the second mixture was degassed under a pressure of about 10 kPa for 1 hour. Then, the second mixture was further stirred for about 60 minutes at 25° C. at a speed of 1,200 rpm to form a homogenized cathode slurry.

The homogenized cathode slurry was coated onto both sides of an aluminum foil having a thickness of 16 µm as a current collector using a doctor blade coater with a gap width of 120 µm. The coated slurry of 80 µm on the aluminum foil was dried to form a cathode electrode layer by an electrically heated oven at 85° C. The drying time was about 120 minutes. The electrode was then pressed to decrease the thickness of a cathode electrode layer to 34 µm. The surface density of the cathode electrode layer on the current collector was 16.00 mg/cm².

C) Preparation of Negative Electrode

A negative electrode slurry was prepared by mixing 93 wt. % of graphite (BTR New Energy Materials Inc., Shenzhen, Guangdong, China) with 1 wt. % carboxymethyl cellulose (CMC, BSH-12, DKS Co. Ltd., Japan) and 3 wt. % SBR (AL-2001, NIPPON A&L INC., Japan) as a binder, and 3 wt. % carbon black as a conductive agent in deionized water. The solid content of the anode slurry was 51.5 wt. %. The slurry was coated onto both sides of a copper foil having a thickness of 8 µm using a doctor blade coater with a gap width of about 120 µm. The coated slurry on the copper foil was dried at about 85° C. for 120 minutes by a hot air dryer to obtain a negative electrode. The electrode was then pressed to decrease the thickness of an anode electrode layer to 60 µm and the surface density of the anode electrode layer was 10 mg/cm².

D) Assembling of Pouched-Type Batteries

After drying, the resulting cathode coating and anode coating were used to prepare the cathode sheet and anode sheet respectively by cutting into pieces of rectangular shape in the size of 5.2 cm×8.5 cm and 5.4 cm×8.7 cm correspondingly. Pouch-type batteries were prepared by stacking the cathode and anode sheets in an alternating manner and separated by porous polyethylene separators (Celgard, LLC, US) having a thickness of 25 µm. The electrolyte was a solution of $LiPF_6$ (1 M) in a mixture of ethylene carbonate (EC), ethyl methyl carbonate (EMC) and dimethyl carbonate (DMC) in a volume ratio of 1:1:1. The cells were assembled in high-purity argon atmosphere with moisture and oxygen content <1 ppm. After electrolyte filling, the pouch cells were vacuum sealed and then mechanically pressed using a punch tooling with standard shape.

The assembled pouch-type batteries were then subjected to repeated charge and discharge cycles at a constant current rate of 1 C between 3.0 V and 4.2 V to mimic the real-life usage patterns. The actual cell capacity was about 5 Ah. The nominal capacity fell below 80% of its initial rated capacity after 800 cycles.

Recycling of Batteries

A) Discharging and Disassembling of Pouched-Type Batteries

Used lithium-ion batteries (0.5 kg) were fully discharged by soaking in 6% NaCl solution for 12 hours. After discharging, the lithium-ion batteries were mechanically disassembled using a cutter to recover the electrodes. Electrodes were cut into smaller pieces having an average length of from about 2 cm to about 4 cm.

B) Preparation of Delamination Solution 53.0 g of anhydrous sodium carbonate (Sigma-Aldrich, USA) was added to 1000 g of DI water to form a delamination solution with a concentration of 0.5 M.

C) Immersion of Cathode in Delamination Solution 5.07 g of cathode was placed in a vessel containing 1000 g of the delamination solution heated to 70° C. The cathode layer was detached from the aluminum foil. Once the cathode layer was observed to have been delaminated, the delamination solution comprising sodium carbonate and DI water was then removed by passing through a sieve having a mesh width of 4 mm to recover the cathode layer and the aluminum foil. The delamination solution could be further reused for delaminating electrodes. The recovered cathode layer and the aluminum foil were dried in an oven for 5 hours at 80° C. under atmospheric pressure and obtained a recovery rate of 99.80%. The delamination success rate and recovery rate of the cathode materials after delamination were measured and is shown in Table 1 below.

Assembling of Pouch-Type Full Lithium-Ion Batteries of Examples 2-3

Pouch-type lithium-ion batteries were prepared by the method described in Example 1. The assembled pouch-type batteries were then subjected to repeated cycling in the same manner as in Example 1.

Recycling of Batteries of Example 2

A) Discharging and Disassembling of Pouched-Type Batteries

Used lithium-ion batteries were discharged and disassembled by the same method described in Example 1.

B) Preparation of Delamination Solution 74.19 g of anhydrous sodium carbonate (Sigma-Aldrich, USA) was added to 1000 g of DI water to form a delamination solution with a concentration of 0.7 M.

C) Immersion of Cathode in Delamination Solution

Cathodes were immersed and delaminated by the method described in Example 1, except the above delamination solution was used. The delamination success rate and recovery rate of the cathode materials after delamination were measured and is shown in Table 1 below.

Recycling of Batteries of Example 3

A) Discharging and Disassembling of Pouched-Type Batteries

Used lithium-ion batteries were discharged and disassembled by the same method described in Example 1.

B) Preparation of Delamination Solution 212 g of anhydrous sodium carbonate (Sigma-Aldrich, USA) was added to 1000 g of DI water to form a delamination solution with a concentration of 2.0 M.

C) Immersion of Cathode in Delamination Solution

Cathodes were immersed and delaminated by the method described in Example 1, except the above delamination solution was used. The delamination success rate and recovery rate of the cathode materials after delamination were measured and is shown in Table 1 below.

Assembling of Pouch-Type Full Lithium-Ion Batteries of Examples 4-8

Pouch-type lithium-ion batteries were prepared by the method described in Example 3. The assembled pouch-type batteries were then subjected to repeated cycling in the same manner as in Example 3.

Recycling of Batteries of Example 4

Recycling of batteries was performed in the same manner as in Example 3, except that the delamination solution was heated to 25° C. The delamination success rate and recovery rate of the cathode materials after delamination were measured and is shown in Table 1 below.

Recycling of Batteries of Example 5

Recycling of batteries was performed in the same manner as in Example 3, except that the delamination solution was heated to 50° C. The delamination success rate and recovery rate of the cathode materials after delamination were measured and is shown in Table 1 below.

Recycling of Batteries of Example 6

Recycling of batteries was performed in the same manner as in Example 3, except that the delamination solution was heated to 90° C. The delamination success rate and recovery rate of the cathode materials after delamination were measured and is shown in Table 1 below.

Recycling of Batteries of Example 7

A) Discharging and Disassembling of Pouched-Type Batteries

Used lithium-ion batteries were discharged and disassembled by the same method described in Example 3.

B) Preparation of Delamination Solution 276 g of anhydrous potassium carbonate (Sigma-Aldrich, USA) was added to 1000 g of DI water to form a delamination solution with a concentration of 2.0 M.

C) Immersion of Cathode in Delamination Solution

Cathodes were immersed and delaminated by the method described in Example 3, except the above delamination solution was used. The delamination success rate and recovery rate of the cathode materials after delamination were measured and is shown in Table 1 below.

Recycling of Batteries of Example 8

A) Discharging and Disassembling of Pouched-Type Batteries

Used lithium-ion batteries were discharged and disassembled by the same method described in Example 3.

B) Preparation of Delamination Solution 150 ml of 25% ammonia solution (Sigma-Aldrich, USA) was added to 850 ml of DI water to form a delamination solution with a concentration of 2.0 M.

C) Immersion of Cathode in Delamination Solution

Cathodes were immersed and delaminated by the method described in Example 3, except the above delamination solution was used. The delamination success rate and recovery rate of the cathode materials after delamination were measured and is shown in Table 1 below.

Preparation of Polymeric Binder of Example 9

26.46 g of sodium hydroxide (NaOH) was added into a round-bottom flask containing 380 g of distilled water. The mixture was stirred at 80 rpm for 30 mins to obtain a first suspension.

51.02 g of acrylic acid was added into the first suspension. The mixture was further stirred at 80 rpm for 30 mins to obtain a second suspension.

10.78 g of acrylamide was dissolved in 10 g of DI water to form an acrylamide solution. Thereafter, 20.78 g of acrylamide solution was added into the second suspension. The mixture was further heated to 55° C. and stirred at 80 rpm for 45 mins to obtain a third suspension.

8.05 g of acrylonitrile was added into the third suspension. The mixture was further stirred at 80 rpm for 10 mins to obtain a fourth suspension.

Further, 0.015 g of water-soluble free radical initiator (ammonium persulfate, APS; obtained from Aladdin Industries Corporation, China) was dissolved in 3 g of DI water and 0.0075 g of reducing agent (sodium bisulfite; obtained from Tianjin Damao Chemical Reagent Factory, China) was dissolved in 1.5 g of DI water. 3.015 g of APS solution and 1.5075 g of sodium bisulfite solution were added into the fourth suspension. The mixture was stirred at 200 rpm for 24 h at 55° C. to obtain a fifth suspension.

After the complete reaction, the temperature of the fifth suspension was lowered to 25° C. 3.72 g of NaOH was dissolved in 400 g of DI water. Thereafter, 403.72 g of sodium hydroxide solution was added dropwise into the fifth suspension to adjust pH to 7.3 to form the sixth suspension. The sixth suspension was filtered using 200 μm nylon mesh to form the binder material. The components of the copolymeric binder of Example 9 and their respective proportions are shown in Table 1 below.

Preparation of Polymeric Binder of Example 10

18.37 g of sodium hydroxide (NaOH) was added into a round-bottom flask containing 380 g of distilled water. The mixture was stirred at 80 rpm for 30 mins to obtain a first suspension.

36.44 g of acrylic acid was added into the first suspension. The mixture was further stirred at 80 rpm for 30 mins to obtain a second suspension.

15.82 g of acrylamide was dissolved in 10 g of DI water to form an acrylamide solution. Thereafter, 25.82 g of acrylamide solution was added into the second suspension. The mixture was further heated to 55° C. and stirred at 80 rpm for 45 mins to obtain a third suspension.

15.03 g of acrylonitrile was added into the third suspension. The mixture was further stirred at 80 rpm for 10 mins to obtain a fourth suspension.

Further, 0.015 g of water-soluble free radical initiator (ammonium persulfate, APS; obtained from Aladdin Industries Corporation, China) was dissolved in 3 g of DI water and 0.0075 g of reducing agent (sodium bisulfite; obtained from Tianjin Damao Chemical Reagent Factory, China) was dissolved in 1.5 g of DI water. 3.015 g of APS solution and 1.5075 g of sodium bisulfite solution were added into the fourth suspension. The mixture was stirred at 200 rpm for 24 h at 55° C. to obtain a fifth suspension.

After the complete reaction, the temperature of the fifth suspension was lowered to 25° C. 3.72 g of NaOH was dissolved in 400 g of DI water. Thereafter, 403.72 g of sodium hydroxide solution was added dropwise into the fifth suspension to adjust pH to 7.3 to form the sixth suspension. The sixth suspension was filtered using 200 μm nylon mesh to form the binder material. The components of the copolymeric binder of Example 10 and their respective proportions are shown in Table 1 below.

Preparation of Polymeric Binder of Example 11

18.37 g of sodium hydroxide (NaOH) was added into a round-bottom flask containing 380 g of distilled water. The mixture was stirred at 80 rpm for 30 mins to obtain a first suspension.

36.44 g of acrylic acid was added into the first suspension. The mixture was further stirred at 80 rpm for 30 mins to obtain a second suspension.

20.13 g of acrylamide was dissolved in 10 g of DI water to form an acrylamide solution. Thereafter, 30.13 g of acrylamide solution was added into the second suspension. The mixture was further heated to 55° C. and stirred at 80 rpm for 45 mins to obtain a third suspension.

11.81 g of acrylonitrile was added into the third suspension. The mixture was further stirred at 80 rpm for 10 mins to obtain a fourth suspension.

Further, 0.015 g of water-soluble free radical initiator (ammonium persulfate, APS; obtained from Aladdin Industries Corporation, China) was dissolved in 3 g of DI water and 0.0075 g of reducing agent (sodium bisulfite; obtained from Tianjin Damao Chemical Reagent Factory, China) was dissolved in 1.5 g of DI water. 3.015 g of APS solution and 1.5075 g of sodium bisulfite solution were added into the fourth suspension. The mixture was stirred at 200 rpm for 24 h at 55° C. to obtain a fifth suspension.

After the complete reaction, the temperature of the fifth suspension was lowered to 25° C. 3.72 g of NaOH was dissolved in 400 g of DI water. Thereafter, 403.72 g of sodium hydroxide solution was added dropwise into the fifth suspension to adjust pH to 7.3 to form the sixth suspension. The sixth suspension was filtered using 200 μm nylon mesh to form the binder material. The components of the copolymeric binder of Example 11 and their respective proportions are shown in Table 1 below.

Assembling of Pouch-Type Full Lithium-Ion Batteries of Examples 9-11

A) Preparation of Positive Electrodes

The positive electrodes were prepared by the method described in Example 3, except the binder materials prepared for Examples 9-11 were each individually used to produce the cathodes of Examples 9-11 respectively.

B) Preparation of Negative Electrodes

The negative electrodes were prepared by the method described in Example 3.

C) Assembling of Pouched-Type Batteries

Pouch-type lithium-ion batteries were prepared by the method described in Example 3. The assembled pouch-type batteries were then subjected to repeated cycling in the same manner as in Example 3.

Assembling of Pouch-Type Full Lithium-Ion Batteries of Example 12

Pouch-type lithium-ion batteries were prepared by the method described in Example 3, except that 276 g of $NMC_{532}$ was replaced with LCO of the same weight. The assembled pouch-type batteries were then subjected to repeated cycling in the same manner as in Example 3.

Assembling of Pouch-Type Full Lithium-Ion Batteries of Example 13

Pouch-type lithium-ion batteries were prepared by the method described in Example 3, except that 276 g of $NMC_{532}$ was replaced with LFP (Tianjin Sitelan Energy Technology Co. Ltd., China) of the same weight. The assembled pouch-type batteries were then subjected to repeated cycling in the same manner as in Example 3.

Assembling of Pouch-Type Full Lithium-Ion Batteries of Example 14

Pouch-type lithium-ion batteries were prepared by the method described in Example 3, except that in the preparation of the polymeric binder, 36.04 g of acrylic acid was replaced with 50.08 g of 2-ethylacrylic acid in the preparation of the second suspension. The assembled pouch-type batteries were then subjected to repeated cycling in the same manner as in Example 3.

Assembling of Pouch-Type Full Lithium-Ion Batteries of Example 15

Pouch-type lithium-ion batteries were prepared by the method described in Example 3, except that in the preparation of the polymeric binder, 36.04 g of acrylic acid was replaced with 54.08 g of vinylsulfonic acid in the preparation of the second suspension. The assembled pouch-type batteries were then subjected to repeated cycling in the same manner as in Example 3.

Recycling of Batteries of Examples 9-15

Recycling of batteries was performed in the same manner as in Example 3. The delamination success rates and recovery rates of the cathode materials after delamination were measured and is shown in Table 1 below.

Assembling of Pouch-Type Full Lithium-Ion Batteries of Comparative Example 1

A) Preparation of Positive Electrode

A first suspension was prepared by dispersing 10 g of polyvinylidene fluoride, PVDF (Solef® 5130, obtained from Solvay S. A., Belgium) as the polymeric binder in 250 g of NMP (≥99%, Sigma-Aldrich, USA) in a 500 mL round bottom flask while stirring with an overhead stirrer at 500 rpm for about 3 hours.

Thereafter, 15 g of SuperP was added into the first suspension and stirred at 1,200 rpm for 30 minutes to obtain the second suspension.

A third suspension was prepared by dispersing 225 g of $NMC_{532}$ into the second suspension at 25° C. while stirring with an overhead stirrer. Then, the third suspension was degassed under a pressure of about 10 kPa for 1 hour. The third suspension was further stirred for about 90 minutes at 25° C. at a speed of 1,200 rpm to form a homogenized cathode slurry.

The homogenized cathode slurry was coated onto both sides of an aluminum foil having a thickness of 16 μm as a current collector using a doctor blade coater with a gap width of 120 μm. The coated slurry of 80 μm on the aluminum foil was dried to form a cathode electrode layer by an electrically heated oven at 85° C. The drying time was about 120 minutes. The electrode was then pressed to decrease the thickness of the cathode electrode layer to 34 μm.

B) Preparation of Negative Electrode

The negative electrode was prepared in the same manner as in Example 6.

C) Assembling of Pouched-Type Batteries

The pouch-type batteries were assembled in the same manner as in Example 6. The assembled pouch-type batteries were then subjected to repeated cycling in the same manner as in Example 6.

Recycling of Batteries of Comparative Example 1

Recycling of batteries was performed in the same manner as in Example 6, except if delamination was not complete, the reaction was aborted after 15 minutes. The delamination success rate and recovery rate of the cathode constituents after delamination were measured and is shown in Table 2 below.

Assembling of Pouch-Type Full Lithium-Ion Batteries of Comparative Example 2

Pouch-type lithium-ion batteries were prepared by the method described in Example 6. The assembled pouch-type batteries were then subjected to repeated cycling in the same manner as in Example 6.

Recycling of Batteries of Comparative Example 2

Recycling of batteries was performed in the same manner as in Example 6, except that delamination agent was not added and only 1000 g of DI water was added in the preparation of the delamination solution. If delamination was not complete, the reaction was aborted after 15 minutes. The delamination success rate and recovery rate of the cathode materials after delamination were measured and is shown in Table 2 below.

Assembling of Pouch-Type Full Lithium-Ion Batteries of Comparative Example 3

Pouch-type lithium-ion batteries were prepared by the method described in Example 6. The assembled pouch-type batteries were then subjected to repeated cycling in the same manner as in Example 6.

Recycling of Batteries of Comparative Example 3

A) Discharging and Disassembling of Pouched-Type Batteries

Used lithium-ion batteries were discharged and disassembled by the same method described in Example 6.

B) Preparation of Delamination Solution 10.60 g of anhydrous sodium carbonate (Sigma-Aldrich, USA) was added to 1000 g of DI water to form a delamination solution with a concentration of 0.1 M.

C) Immersion of Cathode in Delamination Solution

Cathodes were immersed and delaminated by the method described in Example 6, except the above delamination solution was used. If delamination was not complete, the reaction was aborted after 15 minutes. The delamination success rate and recovery rate of the cathode materials after delamination were measured and is shown in Table 2 below.

Assembling of Pouch-Type Full Lithium-Ion Batteries of Comparative Example 4

Pouch-type lithium-ion batteries were prepared by the method described in Example 6, except that in the preparation of polymeric binder, 7.45 g of sodium hydroxide was added in the preparation of the first suspension, 16.77 g of acrylic acid was added in the preparation of the second suspension, 7.19 g of acrylamide was added in the preparation of the third suspension and 35.95 g of acrylonitrile was added in the preparation of the fourth suspension. The assembled pouch-type batteries were then subjected to repeated cycling in the same manner as in Example 6.

Recycling of Batteries of Comparative Example 4

Recycling of batteries was performed in the same manner as in Example 6, except if delamination was not complete, the reaction was aborted after 15 minutes. The delamination success rate and recovery rate of the cathode materials after delamination were measured and is shown in Table 2 below.

Assembling of Pouch-Type Full Lithium-Ion Batteries of Comparative Example 5

Pouch-type lithium-ion batteries were prepared by the method described in Example 3, except that in the preparation of polymeric binder, 30.51 g of sodium hydroxide was added in the preparation of the first suspension, 58.31 g of acrylic acid was added in the preparation of the second suspension, acrylamide was not added in the preparation of the third suspension and 10.73 g of acrylonitrile was added in the preparation of the fourth suspension. The assembled pouch-type batteries were then subjected to repeated cycling in the same manner as in Example 3.

Assembling of Pouch-Type Full Lithium-Ion Batteries of Comparative Example 6

Pouch-type lithium-ion batteries were prepared by the method described in Example 3, except that in the preparation of polymeric binder, 24.44 g of sodium hydroxide was added in the preparation of the first suspension, 47.38 g of acrylic acid was added in the preparation of the second suspension, 25.16 g of acrylamide was added in the preparation of the third suspension and acrylonitrile was not added in the preparation of the fourth suspension. The assembled pouch-type batteries were then subjected to repeated cycling in the same manner as in Example 3.

Recycling of Batteries of Comparative Examples 5-6

Recycling of batteries was performed in the same manner as in Example 3, except if delamination was not complete, the reaction was aborted after 15 minutes. The delamination success rates and recovery rates of the cathode materials after delamination were measured and is shown in Table 2 below.

Assembling of Pouch-Type Full Lithium-Ion Batteries of Comparative Example 7

Pouch-type lithium-ion batteries were prepared by the method described in Example 3. The assembled pouch-type batteries were then subjected to repeated cycling in the same manner as in Example 3.

Recycling of Batteries of Comparative Example 7

A) Discharging and Disassembling of Pouched-Type Batteries

Used lithium-ion batteries were discharged and disassembled by the same method described in Example 3.

B) Preparation of Delamination Solution 168 g of anhydrous sodium bicarbonate (Sigma-Aldrich, USA) was added to 1000 g of DI water to form a delamination solution with a concentration of 2.0 M.

C) Immersion of Cathode in Delamination Solution

Cathodes were immersed and delaminated by the method described in Example 3, except the above delamination solution was used. If delamination was not complete, the reaction was aborted after 15 minutes. The delamination success rate and recovery rate of the cathode materials after delamination were measured and is shown in Table 2 below.

Assembling of Pouch-Type Full Lithium-Ion Batteries of Comparative Example 8

Pouch-type lithium-ion batteries were prepared by the method described in Example 3. The assembled pouch-type batteries were then subjected to repeated cycling in the same manner as in Example 3.

Recycling of Batteries of Comparative Example 8

A) Discharging and Disassembling of Pouched-Type Batteries

Used lithium-ion batteries were discharged and disassembled by the same method described in Example 3.

B) Preparation of Delamination Solution 164 g of anhydrous sodium acetate (Sigma-Aldrich, USA) was added to 1000 g of DI water to form a delamination solution with a concentration of 2.0 M.

C) Immersion of Cathode in Delamination Solution

Cathodes were immersed and delaminated by the method described in Example 3, except the above delamination solution was used. If delamination was not complete, the reaction was aborted after 15 minutes. The delamination success rate and recovery rate of the cathode materials after delamination were measured and is shown in Table 2 below.

Assembling of Pouch-Type Full Lithium-Ion Batteries of Comparative Example 9

Pouch-type lithium-ion batteries were prepared by the method described in Example 3, except that in the preparation of polymeric binder, 16.35 g of sodium hydroxide was added in the preparation of the first suspension, 32.80 g of acrylic acid was added in the preparation of the second suspension, 28.76 g of acrylamide was added in the preparation of the third suspension and 8.05 g of acrylonitrile was added in the preparation of the fourth suspension. The assembled pouch-type batteries were then subjected to repeated cycling in the same manner as in Example 3.

Assembling of Pouch-Type Full Lithium-Ion Batteries of Comparative Example 10

Pouch-type lithium-ion batteries were prepared by the method described in Example 3, except that in the preparation of polymeric binder, 10.28 g of sodium hydroxide was added in the preparation of the first suspension, 21.87 g of acrylic acid was added in the preparation of the second suspension, 25.16 g of acrylamide was added in the preparation of the third suspension and 18.78 g of acrylonitrile was added in the preparation of the fourth suspension. The assembled pouch-type batteries were then subjected to repeated cycling in the same manner as in Example 3.

Assembling of Pouch-Type Full Lithium-Ion Batteries of Comparative Example 11

Pouch-type lithium-ion batteries were prepared by the method described in Example 3, except that in the preparation of polymeric binder, 16.35 g of sodium hydroxide was added in the preparation of the first suspension, 32.80 g of acrylic acid was added in the preparation of the second suspension, 7.19 g of acrylamide was added in the preparation of the third suspension and 24.15 g of acrylonitrile was added in the preparation of the fourth suspension. The assembled pouch-type batteries were then subjected to repeated cycling in the same manner as in Example 3.

Recycling of Batteries of Comparative Examples 9-11

Recycling of batteries was performed in the same manner as in Example 3, except if delamination was not complete, the reaction was aborted after 15 minutes. The delamination success rates and recovery rates of the cathode materials after delamination were measured and is shown in Table 2 below.

TABLE 1

| | Structural units in the copolymer | | | | Delamination solution | | | | | |
|---|---|---|---|---|---|---|---|---|---|---|
| | Proportion of structural unit (a) (mol %) | Proportion of structural unit (b) (mol %) | Proportion of structural unit (c) (mol %) | Cathode active material | Aqueous solvent | Delamination agent Type | Concentration (M) | Delamination success rate (%) | Recovery rate (%) | Time taken (min) |
| Example 1 | 49.45 | 26.48 | 24.07 | NCM532 | Water | $Na_2CO_3$ | 0.5 | 82 | 99.80 | 4 |
| Example 2 | 49.45 | 26.48 | 24.07 | NCM532 | Water | $Na_2CO_3$ | 0.7 | 90 | 99.60 | 4 |
| Example 3 | 49.45 | 26.48 | 24.07 | NCM532 | Water | $Na_2CO_3$ | 2.0 | 95 | 99.80 | 4 |
| Example 4 | 49.45 | 26.48 | 24.07 | NCM532 | Water | $Na_2CO_3$ | 2.0 | 85 | 99.80 | 7 |
| Example 5 | 49.45 | 26.48 | 24.07 | NCM532 | Water | $Na_2CO_3$ | 2.0 | 92 | 99.20 | 5 |
| Example 6 | 49.45 | 26.48 | 24.07 | NCM532 | Water | $Na_2CO_3$ | 2.0 | 95 | 97.80 | 3 |
| Example 7 | 49.45 | 26.48 | 24.07 | NCM532 | Water | $K_2CO_3$ | 2.0 | 94 | 99.60 | 4 |
| Example 8 | 49.45 | 26.48 | 24.07 | NCM532 | Water | $NH_3$ (aq) | 2.0 | 91 | 98.00 | 4 |
| Example 9 | 70.00 | 15.00 | 15.00 | NCM532 | Water | $Na_2CO_3$ | 2.0 | 93 | 99.60 | 4 |
| Example 10 | 50.00 | 22.00 | 28.00 | NCM532 | Water | $Na_2CO_3$ | 2.0 | 94 | 99.40 | 4 |
| Example 11 | 50.00 | 28.00 | 22.00 | NCM532 | Water | $Na_2CO_3$ | 2.0 | 95 | 99.20 | 4 |
| Example 12 | 49.45 | 26.48 | 24.07 | LCO | Water | $Na_2CO_3$ | 2.0 | 94 | 99.60 | 4 |
| Example 13 | 49.45 | 26.48 | 24.07 | LFP | Water | $Na_2CO_3$ | 2.0 | 92 | 99.40 | 4 |
| Example 14 | 49.45 | 26.48 | 24.07 | NCM532 | Water | $Na_2CO_3$ | 2.0 | 91 | 99.40 | 4 |
| Example 15 | 49.45 | 26.48 | 24.07 | NCM532 | Water | $Na_2CO_3$ | 2.0 | 93 | 99.60 | 4 |

TABLE 2

| | Structural units in the copolymer | | | | Delamination solution | | | | | |
|---|---|---|---|---|---|---|---|---|---|---|
| | Proportion of structural unit (a) (mol %) | Proportion of structural unit (b) (mol %) | Proportion of structural unit (c) (mol %) | Cathode active material | Aqueous solvent | Delamination agent Type | Concentration (M) | Delamination success rate (%) | Recovery rate (%) | Time taken (min) |
| Comparative Example 1* | 0.00 | 0.00 | 0.00 | NCM532 | Water | $Na_2CO_3$ | 2.0 | 3 | —# | 15 |
| Comparative Example 2 | 49.45 | 26.48 | 24.07 | NCM532 | Water | — | — | 5 | —# | 15 |

TABLE 2-continued

| | Structural units in the copolymer | | | | Delamination solution | | | | |
| --- | --- | --- | --- | --- | --- | --- | --- | --- | --- |
| | Proportion of structural unit (a) (mol %) | Proportion of structural unit (b) (mol %) | Proportion of structural unit (c) (mol %) | Cathode active material | Aqueous solvent | Delamination agent Type | Concentration (M) | Delamination success rate (%) | Recovery rate (%) | Time taken (min) |
| Comparative Example 3 | 49.45 | 26.48 | 24.07 | NCM532 | Water | Na$_2$CO$_3$ | 0.1 | 10 | —# | 15 |
| Comparative Example 4 | 23.01 | 10.00 | 66.99 | NCM532 | Water | Na$_2$CO$_3$ | 2.0 | 21 | —# | 15 |
| Comparative Example 5 | 80.00 | 0.00 | 20.00 | NCM532 | Water | Na$_2$CO$_3$ | 2.0 | 24 | —# | 15 |
| Comparative Example 6 | 65.00 | 35.00 | 0.00 | NCM532 | Water | Na$_2$CO$_3$ | 2.0 | 23 | —# | 15 |
| Comparative Example 7 | 49.45 | 26.48 | 24.07 | NCM532 | Water | NaHCO$_3$ | 2.0 | 15 | —# | 15 |
| Comparative Example 8 | 49.45 | 26.48 | 24.07 | NCM532 | Water | NaAc | 2.0 | 3 | —# | 15 |
| Comparative Example 9 | 45.00 | 40.00 | 15.00 | NCM532 | Water | Na$_2$CO$_3$ | 2.0 | 18 | —# | 15 |
| Comparative Example 10 | 30.00 | 35.00 | 35.00 | NCM532 | Water | Na$_2$CO$_3$ | 2.0 | 21 | —# | 15 |
| Comparative Example 11 | 45.00 | 10.00 | 45.00 | NCM532 | Water | Na$_2$CO$_3$ | 2.0 | 24 | —# | 15 |

*PVDF was used as the binder instead.
As success rate was under 75%, recovery rate was not calculated.

While the invention has been described with respect to a limited number of embodiments, the specific features of one embodiment should not be attributed to other embodiments of the invention. In some embodiments, the methods may include numerous steps not mentioned herein. In other embodiments, the methods do not include, or are substantially free of, any steps not enumerated herein. Variations and modifications from the described embodiments ex ist. The appended claims intend to cover all those modifications and variations as falling within the scope of the invention.

What is claimed is:

1. A method for delaminating a composite by immersing the composite into a delamination solution; wherein the composite comprises a metal substrate and a coating applied on one side or both sides of the metal substrate, wherein the coating comprises a copolymeric binder; wherein the copolymeric binder comprises a structural unit (a), derived from a monomer selected from the group consisting of a carboxylic acid group-containing monomer, a sulfonic acid group-containing monomer, a phosphonic acid group-containing monomer, a carboxylic acid salt group-containing monomer, a sulfonic acid salt group-containing monomer, a phosphonic acid salt group-containing monomer, and combinations thereof; wherein the proportion of structural unit (a) within the copolymeric binder is from about 40% to about 80% by mole, based on the total number of moles of monomeric units in the copolymeric binder; wherein the delamination solution comprises a delamination agent and an aqueous solvent; and wherein the delamination agent is a weak base selected from the group consisting of sodium carbonate, potassium carbonate, lithium carbonate, rubidium carbonate, cesium carbonate, ammonia, methylamine, dimethylamine, trimethylamine, ethylamine, diethylamine, triethylamine, propylamine, isopropylamine, dipropylamine, diisopropyl amine, isopropyl ethylamine, diisopropylethylamine, n-butylamine, isobutylamine, di n-butylamine, diisobutylamine, tributylamine, tert-butyl amine, pyridine, piperidine, 4-dimethylaminopyridine (DMAP), 1,8-diazabicyclo [5.4.0] undec-7-ene (DBU), 1,5-diazabicyclo [4.3.0]non-5-ene (DBN), N-methylmorpholine (NMM), 1,4-diazabicyclo [2.2.2]octane (DABCO), 2,6-lutidine, and combinations thereof.

2. The method of claim 1, wherein the concentration of the delamination agent in the delamination solution is from about 0.5 to 5 M.

3. The method of claim 2, wherein the aqueous solvent is water.

4. The method of claim 2, wherein the aqueous solvent comprises water as the major component and a minor component, wherein the proportion of water in the aqueous solvent is greater than 51% and less than 100% by weight; and wherein the minor component is selected from the group consisting of methanol, ethanol, isopropanol, n-propanol, tert-butanol, n-butanol, acetone, dimethyl ketone, methyl ethyl ketone, ethyl acetate, isopropyl acetate, propyl acetate, butyl acetate, and combinations thereof.

5. The method of claim 1, wherein the carboxylic acid group-containing monomer is selected from the group consisting of acrylic acid, methacrylic acid, crotonic acid, 2-butyl crotonic acid, cinnamic acid, maleic acid, maleic anhydride, fumaric acid, itaconic acid, itaconic anhydride, tetraconic acid, 2-ethylacrylic acid, isocrotonic acid, cis-2-pentenoic acid, trans-2-pentenoic acid, angelic acid, tiglic acid, 3,3-dimethyl acrylic acid, 3-propyl acrylic acid, trans-2-methyl-3-ethyl acrylic acid, cis-2-methyl-3-ethyl acrylic acid, 3-isopropyl acrylic acid, trans-3-methyl-3-ethyl acrylic acid, cis-3-methyl-3-ethyl acrylic acid, 2-isopropyl acrylic acid, trimethyl acrylic acid, 2-methyl-3,3-diethyl acrylic acid, 3-butyl acrylic acid, 2-butyl acrylic acid, 2-pentyl acrylic acid, 2-methyl-2-hexenoic acid, trans-3-methyl-2-hexenoic acid, 3-methyl-3-propyl acrylic acid, 2-ethyl-3-propyl acrylic acid, 2,3-diethyl acrylic acid, 3,3-diethyl acrylic acid, 3-methyl-3-hexyl acrylic acid, 3-methyl-3-tert-butyl acrylic acid, 2-methyl-3-pentyl acrylic acid, 3-methyl-3-pentyl acrylic acid, 4-methyl-2-hexenoic acid, 4-ethyl-2-hexenoic acid, 3-methyl-2-ethyl-2-hexenoic acid, 3-tert-butyl acrylic acid, 2,3-dimethyl-3-ethyl acrylic acid, 3,3-dimethyl-2-ethyl acrylic acid, 3-methyl-3-isopropyl acrylic acid, 2-methyl-3-isopropyl acrylic acid, trans-2-octenoic acid, cis-2-octenoic acid, trans-2-decenoic acid, α-acetoxyacrylic acid, β-trans-aryloxyacrylic acid, α-chloro-β-E-methoxyacrylic acid, methyl maleic acid, dimethyl maleic acid, phenyl maleic acid, bromo maleic acid, chloromaleic acid, dichloromaleic acid, fluoromaleic acid, difluoro maleic acid, nonyl hydrogen maleate, decyl hydrogen maleate, dodecyl hydrogen maleate, octadecyl hydrogen maleate, fluoroalkyl hydrogen maleate, maleic anhydride, methyl maleic anhydride, dimethyl maleic anhydride, acrylic anhydride, methacrylic anhydride, and combinations thereof.

6. The method of claim 1, wherein the carboxylic acid salt group-containing monomer is selected from the group consisting of acrylic acid salt, methacrylic acid salt, crotonic acid salt, 2-butyl crotonic acid salt, cinnamic acid salt, maleic acid salt, maleic anhydride salt, fumaric acid salt, itaconic acid salt, itaconic anhydride salt, tetraconic acid salt, 2-ethylacrylic acid salt, isocrotonic acid salt, cis-2-pentenoic acid salt, trans-2-pentenoic acid salt, angelic acid salt, tiglic acid salt, 3,3-dimethyl acrylic acid salt, 3-propyl acrylic acid salt, trans-2-methyl-3-ethyl acrylic acid salt, cis-2-methyl-3-ethyl acrylic acid salt, 3-isopropyl acrylic acid salt, trans-3-methyl-3-ethyl acrylic acid salt, cis-3-methyl-3-ethyl acrylic acid salt, 2-isopropyl acrylic acid salt, trimethyl acrylic acid salt, 2-methyl-3,3-diethyl acrylic acid salt, 3-butyl acrylic acid salt, 2-butyl acrylic acid salt, 2-pentyl acrylic acid salt, 2-methyl-2-hexenoic acid salt, trans-3-methyl-2-hexenoic acid salt, 3-methyl-3-propyl acrylic acid salt, 2-ethyl-3-propyl acrylic acid salt, 2,3-diethyl acrylic acid salt, 3,3-diethyl acrylic acid salt, 3-methyl-3-hexyl acrylic acid salt, 3-methyl-3-tert-butyl acrylic acid salt, 2-methyl-3-pentyl acrylic acid salt, 3-methyl-3-pentyl acrylic acid salt, 4-methyl-2-hexenoic acid salt, 4-ethyl-2-hexenoic acid salt, 3-methyl-2-ethyl-2-hexenoic acid salt, 3-tert-butyl acrylic acid salt, 2,3-dimethyl-3-ethyl acrylic acid salt, 3,3-dimethyl-2-ethyl acrylic acid salt, 3-methyl-3-isopropyl acrylic acid salt, 2-methyl-3-isopropyl acrylic acid salt, trans-2-octenoic acid salt, cis-2-octenoic acid salt, trans-2-decenoic acid salt, α-acetoxyacrylic acid salt, β-trans-aryloxyacrylic acid salt, α-chloro-β-E-methoxyacrylic acid salt, methyl maleic acid salt, dimethyl maleic acid salt, phenyl maleic acid salt, bromo maleic acid salt, chloromaleic acid salt, dichloromaleic acid salt, fluoromaleic acid salt, difluoro maleic acid salt, and combinations thereof.

7. The method of claim 1, wherein the sulfonic acid group-containing monomer is selected from the group consisting of vinylsulfonic acid, methylvinylsulfonic acid, allylvinylsulfonic acid, allylsulfonic acid, methallylsulfonic acid, styrenesulfonic acid, 2-sulfoethyl methacrylic acid, 2-methylprop-2-ene-1-sulfonic acid, 2-acrylamido-2-methyl-1-propane sulfonic acid, 3-allyloxy-2-hydroxy-1-propane sulfonic acid, allyl hydrogensulfate, vinyl hydrogensulfate, and combinations thereof.

8. The method of claim 1, wherein the sulfonic acid salt group-containing monomer is selected from the group consisting of vinylsulfonic acid salt, methylvinylsulfonic acid salt, allylvinylsulfonic acid salt, allylsulfonic acid salt, methallylsulfonic acid salt, styrenesulfonic acid salt, 2-sulfoethyl methacrylic acid salt, 2-methylprop-2-ene-1-sulfonic acid salt, 2-acrylamido-2-methyl-1-propane sulfonic acid salt, 3-allyloxy-2-hydroxy-1-propane sulfonic acid salt, allyl sulfate salt, vinyl sulfate salt, and combinations thereof.

9. The method of claim 1, wherein the phosphonic acid group-containing monomer is selected from the group consisting of vinyl phosphonic acid, allyl phosphonic acid, vinyl benzyl phosphonic acid, acrylamide alkyl phosphonic acid, methacrylamide alkyl phosphonic acid, acrylamide alkyl diphosphonic acid, acryloylphosphonic acid, 2-methacryloyloxyethyl phosphonic acid, bis(2-methacryloyloxyethyl) phosphonic acid, ethylene 2-methacryloyloxyethyl phosphonic acid, ethyl-methacryloyloxyethyl phosphonic acid, allyl hydrogenphosphate, vinyl hydrogenphosphate, and combinations thereof.

10. The method of claim 1, wherein the phosphonic acid salt group-containing monomer is selected from the group consisting of vinyl phosphonic acid salt, salt of allyl phosphonic acid, salt of vinyl benzyl phosphonic acid, salt of acrylamide alkyl phosphonic acid, salt of methacrylamide alkyl phosphonic acid, salt of acrylamide alkyl diphosphonic acid, salt of acryloylphosphonic acid, salt of 2-methacryloyloxyethyl phosphonic acid, salt of bis (2-methacryloyloxyethyl) phosphonic acid, salt of ethylene 2-methacryloyloxyethyl phosphonic acid, salt of ethyl-methacryloyloxyethyl phosphonic acid, allyl phosphate salt, vinyl phosphate salt, and combinations thereof.

11. The method of claim 1, wherein the copolymeric binder further comprises a structural unit (b), wherein structural unit (b) is derived from a monomer selected from the group consisting of an amide group-containing monomer, a hydroxyl group-containing monomer, and combinations thereof.

12. The method of claim 11, wherein the proportion of structural unit (b) within the copolymeric binder is from about 10% to about 35% by mole, based on the total number of moles of monomeric units in the copolymeric binder.

13. The method of claim 11, wherein the amide group-containing monomer is selected from the group consisting of acrylamide, methacrylamide, N-methyl methacrylamide, N-ethyl methacrylamide, N-n-propyl methacrylamide, N-isopropyl methacrylamide, isopropyl acrylamide, N-n-butyl methacrylamide, N-isobutyl methacrylamide, N,N-dimethyl acrylamide, N,N-dimethyl methacrylamide, N,N-diethyl acrylamide, N,N-diethyl methacrylamide, N-methylol methacrylamide, N-(methoxymethyl) methacrylamide, N-(ethoxymethyl)methacrylamide, N-(propoxymethyl) methacrylamide, N-(butoxymethyl)methacrylamide, N,N-dimethylaminopropyl methacrylamide, N,N-dimethylaminoethyl methacrylamide, N,N-dimethylol methacrylamide, diacetone methacrylamide, diacetone acrylamide, methacryloyl morpholine, N-hydroxyl methacrylamide, N-methoxymethyl acrylamide, N-methoxymethyl methacrylamide, N,N'-methylene-bis-acrylamide (MBA), N-hydroxymethyl acrylamide, and combinations thereof.

14. The method of claim 1, wherein the copolymeric binder further comprises a structural unit (c), wherein structural unit (c) is derived from a monomer selected from the group consisting of a nitrile group-containing monomer, an ester group-containing monomer, an epoxy group-containing monomer, a fluorine-containing monomer, and combinations thereof.

15. The method of claim 14, wherein the proportion of structural unit (c) within the copolymeric binder is from about 10% to about 35% by mole, based on the total number of moles of monomeric units in the copolymeric binder; and wherein the nitrile group-containing monomer is selected from the group consisting of acrylonitrile, α-halogenoacrylonitrile, α-alkylacrylonitrile, α-chloroacrylonitrile, α-bromoacrylonitrile, α-fluoroacrylonitrile, methacrylonitrile, α-ethylacrylonitrile, α-isopropylacrylonitrile, α-n-hexylacrylonitrile, α-methoxyacrylonitrile, 3-methoxyacrylonitrile, 3-ethoxyacrylonitrile, α-acetoxyacrylonitrile, α-phenylacrylonitrile, α-tolylacrylonitrile, α-(methoxyphenyl)

acrylonitrile, α-(chlorophenyl)acrylonitrile, α-(cyanophenyl)acrylonitrile, vinylidene cyanide, and combinations thereof.

16. The method of claim 1, wherein the metal substrate is in the form of a foil, sheet, film, or combinations thereof; wherein the metal substrate is selected from the group consisting of stainless steel, titanium, nickel, aluminum, copper, platinum, gold, silver, chromium, zirconium, tungsten, molybdenum, tin, vanadium, zinc, cadmium, iron, cobalt, lead, and alloys thereof.

17. The method of claim 1, wherein the metal substrate is in the form of a porous body having a three-dimensional network structure; wherein the metal substrate is selected from the group consisting of stainless steel, titanium, nickel, aluminum, copper, platinum, gold, silver, chromium, zirconium, tungsten, molybdenum, tin, vanadium, zinc, cadmium, iron, cobalt, lead, and alloys thereof.

18. The method of claim 1, wherein the weight ratio of the composite to the delamination solution is from about 0.01% to about 50%; and wherein the composite is immersed into the delamination solution at a temperature of from about 10° C. to about 90° C.

* * * * *